United States Patent
Heyna et al.

(10) Patent No.: US 12,187,377 B2
(45) Date of Patent: Jan. 7, 2025

(54) BRAKE MOUNTS FOR BICYCLES

(71) Applicant: SRAM, LLC, Chicago, IL (US)

(72) Inventors: Sebastian Heyna, Hambach (DE);
Henrik Braedt, Hambach (DE);
Charles Dunlap, Manitou Springs, CO (US)

(73) Assignee: SRAM, LLC, Chicago, IL (US)

( * ) Notice: Subject to any disclaimer, the term of this patent is extended or adjusted under 35 U.S.C. 154(b) by 299 days.

(21) Appl. No.: 17/539,444

(22) Filed: Dec. 1, 2021

(65) Prior Publication Data

US 2023/0166807 A1 Jun. 1, 2023

(51) Int. Cl.
*B62L 1/00* (2006.01)
*B60B 27/00* (2006.01)
*B60B 27/02* (2006.01)

(52) U.S. Cl.
CPC .......... *B62L 1/005* (2013.01); *B60B 27/0052* (2013.01); *B60B 27/023* (2013.01)

(58) Field of Classification Search
CPC ........ B62L 1/00; B62L 1/005; B60B 27/0052; B60B 27/0063; B62K 25/04; B62K 25/30; B62K 25/286; B62K 19/38; B60Y 2200/13
USPC ............ 301/6.8; 188/126, 24.11, 24.22, 72.1
See application file for complete search history.

(56) References Cited

U.S. PATENT DOCUMENTS

| | | | |
|---|---|---|---|
| 5,957,244 A * | 9/1999 | Turner | B62L 1/005 188/26 |
| 6,386,328 B1 * | 5/2002 | Chen | F16D 65/12 188/26 |
| 7,478,707 B2 | 1/2009 | Chye | |
| 9,227,465 B2 * | 1/2016 | Nakajima | B60B 27/026 |
| 10,131,401 B2 * | 11/2018 | Nolin | B62K 5/027 |
| 10,780,736 B2 * | 9/2020 | Madhaven | B62K 25/10 |
| 10,926,718 B2 * | 2/2021 | Futamata | B62J 45/412 |
| 2003/0192748 A1 | 10/2003 | Lumpkin | |
| 2008/0035431 A1 * | 2/2008 | Vroomen | B62K 21/02 280/281.1 |

(Continued)

FOREIGN PATENT DOCUMENTS

| | | | | |
|---|---|---|---|---|
| CN | 1498782 A | * | 5/2004 | ......... B60B 27/0005 |
| CN | 101103208 A | * | 1/2008 | ............. B62L 1/005 |

(Continued)

OTHER PUBLICATIONS

"Yeti Lawwill DH Custom Frame Made for Jürgen Beneke", Web Page, Last Checked Nov. 19, 2021, <https://www.worthpoint.com/worthopedia/yeti-lawwill-dh-custom-frame-made-176605707>.

(Continued)

*Primary Examiner* — Scott A Browne
*Assistant Examiner* — Eva L Comino

(57) ABSTRACT

Brake mounts for bicycles are described herein. The brake mounts are for coupling a brake caliper to a bicycle. An example brake mount includes a bracket having a first side and a second side opposite the first side. The bracket has bores to receive fasteners to couple the brake caliper to the bracket. The brake mount includes a sleeve extending from the first side of the bracket. An opening extends through the sleeve and the bracket. The opening is to receive an axle of a hub assembly of the bicycle. The sleeve is to extend into an axle opening in a frame of the bicycle. A distal end of the sleeve is threaded. The brake mount also includes a nut to be threadably coupled to the distal end of the sleeve when the sleeve is inserted into the axle opening in the frame e.

12 Claims, 13 Drawing Sheets

(56) References Cited

U.S. PATENT DOCUMENTS

| | | | |
|---|---|---|---|
| 2013/0053223 A1* | 2/2013 | Shu-Chiung | A63B 21/0051 482/61 |
| 2014/0265225 A1* | 9/2014 | D'Aluisio | B62K 21/02 280/276 |
| 2015/0291250 A1 | 10/2015 | Nagai | |
| 2019/0376778 A1* | 12/2019 | Choi | G01B 5/25 |

FOREIGN PATENT DOCUMENTS

| | | | | |
|---|---|---|---|---|
| CN | 104768842 A | * | 7/2015 | B62K 19/38 |
| DE | 102018205046 A1 | * | 10/2018 | B62K 19/38 |
| JP | H082472 | | 1/1996 | |
| JP | 5873567 | | 3/2016 | |
| TW | M316211 U | | 8/2007 | |
| TW | M597744 U | | 7/2020 | |

OTHER PUBLICATIONS

"1998 Yeti DH-8", Web Page, Last Checked Nov. 19, 2021, <http://www.vintagemtbworkshop.com/1998-yeti-dh-8.html>.

Christopher Bayer, "First Look: Ghost presents the new RIOT LT", Web Page, Nov. 17, 2014, <https://enduro-mtb.com/en/first-look-ghost-presents-the-new-riot-lt/>.

Tyler Benedict, "Ghost's 2016 AMR platform builds three trail bikes from one frame, new Lector World Cup & more", Web Page, Jul. 5, 2015, <https://bikerumor.com/ghosts-2016-amr-platform-builds-three-trail-bikes-from-one-frame-new-lector-world-cup-more/>.

Mike Kazimer, "Ghost Bikes AMR Rio 9", Web Page, Aug. 14, 2013, <https://www.pinkbike.com/news/First-Look-Ghost-Bikes-AMR-Riot-9.html?trk=rss>.

Greg Kopecky, "2020 Trek Checkpoint gravel bike gets updates, wide-range 1x drivetrain option", Web Page, Aug. 13, 2019, <https://bikerumor.com/2020-trek-checkpoint-gravel-bike-gets-updates-wide-range-1x-drivetrain-option/>.

Cory Benson, "Reshaped MMR Kenta prototype XC mountain bike gets Nove Mesto World Cup race debut", Web Page, May 17, 2021, <https://bikerumor.com/reshaped-mmr-kenta-prototype-xc-mountain-bike-gets-nove-mesto-world-cup-race-debut/>.

James Smurthwaite, "MMR's Prototype Kenta Full Suspension XC Race Bike", Web Page, May 17, 2021, <https://www.pinkbike.com/news/mmrs-prototype-kenta-full-suspension-race-bike-albstadt-xc-world-cup-2021.html?trk=rss>.

Francesco Mazza, "Riconoscere i sistemi Virtual Pivot", Web Page, Jul. 1, 2014, <https://www.mtb-mag.com/riconoscere-i-sistemi-virtual-pivot/>, IT.

"Yetifan 90s", Web Page, Last Checked Nov. 19, 2021, <http://www.yetifan.com/YETI_PAST/80s/00s/90s/90s.html>.

* cited by examiner

BRAKE MOUNTS FOR BICYCLES

FIELD OF THE DISCLOSURE

This disclosure relates generally to bicycle components and, more specifically, to brake mounts for bicycles.

BACKGROUND

Bicycles and other human powered vehicles often include disc brakes. A disc brake includes a brake rotor and a brake caliper. The brake rotor is typically mounted to a hub on a wheel of the bicycle, and the brake caliper is mounted to a fixed portion of the bicycle such as the frame. When the brake caliper is actuated, the brake caliper moves one or more brake pads into engagement with the brake rotor, which slows the brake rotor and, thus, reduces the speed of the bicycle.

SUMMARY

A brake mount for coupling a brake caliper to a bicycle is disclosed herein. The brake mount includes a bracket having a first side and a second side opposite the first side. The bracket has bores to receive fasteners to couple the brake caliper to the bracket. The brake mount includes a sleeve extending from the first side of the bracket. An opening extends through the sleeve and the bracket. The opening is to receive an axle of a hub assembly of the bicycle. The sleeve is to extend into an axle opening in a frame of the bicycle. A distal end of the sleeve is threaded. The brake mount also includes a nut to be threadably coupled to the distal end of the sleeve when the sleeve is inserted into the axle opening in the frame.

A brake mount for coupling a brake caliper to a bicycle is disclosed herein. The brake mount includes a post to be coupled to an inboard side of a frame of the bicycle. The brake mount also includes a bracket having bores to receive fasteners to couple the brake caliper to the bracket, a first opening to receive an axle of a hub assembly of the bicycle, and a second opening. The post is to extend through the second opening when the bracket is installed on the bicycle. The bracket also has gap extending between the second opening and a peripheral edge of the bracket, and a fastener opening extending into the bracket. The brake mount also includes a clamp bolt to be threadably inserted into the fastener opening to reduce an inner diameter of the second opening to clamp the bracket onto the post.

A hub assembly of a bicycle is disclosed herein. The hub assembly includes a hub, a brake rotor coupled to and rotatable with the hub, and a bracket having bores to receive fasteners to couple a brake caliper to the bracket. The bracket has a first side, a second side, and an opening extending between the first and second sides. The hub assembly also includes a sleeve extending from the first side of the bracket. The sleeve is coaxial with the opening in the bracket. The hub assembly further includes an axle extending through the sleeve, the opening in the bracket, the brake rotor, and the hub. The axle has a head engaged with the sleeve such that the sleeve and the bracket are axially clamped between the head of the axle and an end of the hub.

BRIEF DESCRIPTION OF THE DRAWINGS

The figures are not to scale. Instead, the thickness of the layers or regions may be enlarged in the drawings. In general, the same reference numbers will be used throughout the drawing(s) and accompanying written description to refer to the same or like parts.

Figure 1:
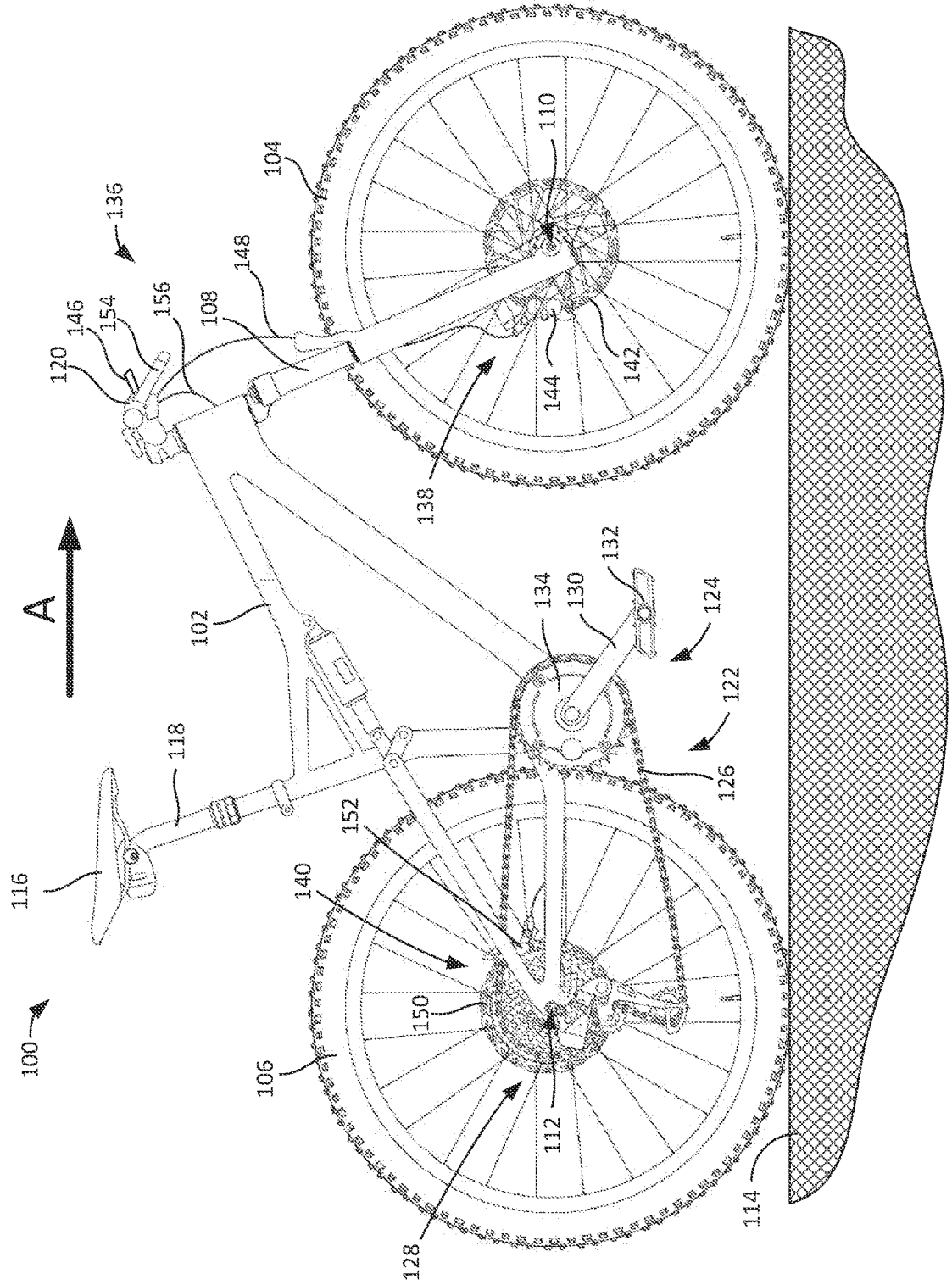
FIG. 1 is a side view of an example bicycle that may employ any of the example brake mounts, hub assemblies, and/or other components disclosed herein.

Descriptors "first," "second," "third," etc. are used herein when identifying multiple elements or components that may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Brakes on modern bicycles (including electric bicycles (e-bikes)) have evolved to utilize technology from automotive braking systems, such as disc brakes. Disc brakes have greater stopping power and deceleration control than traditional rim and cable pull brakes used in the past. The front and/or rear brakes on a bicycle may be implemented as disc brakes.

A disc brake includes a brake rotor and a brake caliper. The brake rotor is typically coupled to and rotates with a hub on a wheel of the bicycle. The brake caliper is typically mounted to a stationary part of the bicycle, such as the frame, near the brake rotor. When the brake caliper is actuated, the brake caliper moves two brake pads into engagement with the outer surface(s) of the brake rotor. The friction between the brake pads and the brake rotor causes the brake rotor to slow, thereby reducing the speed of the wheel and, thus, the bicycle.

A small gap between brake pads and brake rotor is important to realize high brake power while maintaining proper lever ergonomics. The relevant physical values for the rider ergonomics are lever travel and actuation force. Also, when not braking, it is undesired for the brake rotor to contact the brake pads as this generates wasteful rolling friction that slows the bicycle and causes unnecessary wear on the brake rotor and brake pads. This contact may also cause undesirable noise (e.g., brake squeaking).

Therefore, the main challenge for proper brake setup is to achieve an accurate parallel alignment between the brake pads and the brake rotor. This parallel alignment is dependent on the axial and radial position of the brake caliper relative to the brake rotor. Current disc brake assembly requires a painstaking adjustment process to ensure the brake rotor is centered between the brake pads to avoid non-braking contact. Often, the brake caliper and/or the brake rotor need multiple shims or spacers to aid in this centering adjustment. With current brake designs, this alignment must be adjusted manually during the caliper assembly process. This process requires manual dexterity and often results in unproper brake setup and rider dissatisfaction.

The rear triangle of a bicycle frame includes a through-hole on a left frame portion and a threaded hole on a right frame portion. A rear hub assembly includes a hub that is disposed between the two frame portions of the rear triangle with a through-axle (e.g., a bolt). The left and right frame portions includes left and right chainstays and seatstays. To accommodate the wheel, the chainstay and seatstay extend a relatively long distance from their connection to the main frame (e.g., a standard chainstay length is about 430-460 millimeters (mm)). This geometric boundary condition affects the alignment tolerances of the holes in the frame portions. In particular, the through-hole is typically sized larger than necessary to fix the axle so that the axle fits loosely in the through-hole. This results in the rear hub assembly being able to move relative to the frame and compensate for the tolerances of the holes in the frame portions. As the brake caliper is assembled to the frame, the mounting precision relative to the brake rotor is directly affected by this compensation. While some known systems utilize a brake mount to couple the brake caliper to the frame, the brake mount is fixedly or rigidly coupled to the frame and, thus, still has a strong reference to the frame. As such, the brake rotor (which is referenced to the rear hub) can be slightly misaligned with the brake caliper (which is referenced to the frame). As explained above, this exacerbates the process of aligning the brake caliper and brake rotor so the brake pads are parallel to and equally spaced from the brake rotor.

As used herein, the terms "axial," "axially" and other variations thereof mean a direction that that coincides with or is parallel to a rotational axis, which may be defined by a brake rotor and/or a hub. As used herein, the terms "radial," "radially," and other variations thereof mean a direction that extends orthogonally from the rotational axis, and which can include a radially inward direction that is toward the rotational axis or a radially outward direction that is away from the rotational axis. As used herein, the terms "circumferential," "circumferentially," and other variations thereof mean a direction that extends concentrically around the rotational axis. As used herein, the term "inboard" means in the axial direction toward a center plane of a wheel or other rotatable object. As used herein, the term "outboard" means in the axial direction away from the center plane of the wheel or other rotatable object.

Disclosed herein are example brake mounts and hub assemblies with example brake mounts that address at least the drawbacks noted above. The example brake mounts can be used to couple a brake caliper to a bicycle. The example brake mounts disclosed herein may be considered universal brake mounts or adapters. The example brake mounts can be used to mount various brake calipers to the bicycle. The example brake mounts disclosed herein create a stronger or absolute axial and radial reference to the hub assembly rather than the frame. Therefore, even if the dimensional tolerances of the frame allow misalignment between the rear hub assembly and the frame, the brake caliper and the brake rotor remain axially and radially aligned. This reduces or eliminates the time needed to accurately position the brake caliper relative to the brake rotor during initial setup and over time as required with traditional brake. The example brake mounts disclosed herein also reduce or eliminate unbalanced braking forces and unnecessary brake rub, thereby improving braking performance and prolonging the life cycle of the brake components.

An example brake mount disclosed herein includes a bracket for coupling a brake caliper to the bicycle. In some examples, the brake caliper is coupled to the bracket via one or more threaded fasteners (e.g., bolts). The bracket is to be disposed on an inboard side of a frame of the bicycle, between the hub of the rear hub assembly and the frame. The bracket includes a first opening to receive an axle of the rear hub assembly. In particular, when the bracket is assembled on the bicycle, the axle extends through the frame, through the bracket, and through the hub. The bracket also includes a second opening. A post extends through the second opening and into a frame member, such as the left seatstay. During braking, forces are transferred through the bracket to the post and, thus, to the frame.

In some examples disclosed herein, the brake mount includes a sleeve coupled to and extending from a side of the bracket. The sleeve is co-axial with the first opening. When the brake mount is assembled on the bicycle, the sleeve extends into an axle opening in the frame, and the axle extends through the sleeve. In some examples, the sleeve extends completely through the axle opening, such that a distal end of the sleeve is disposed outboard of the frame. In other examples, the sleeve extends only partially into the axle opening. In some examples, a distal end of the sleeve is threaded, and the brake mount includes a nut that can be screwed onto the distal end of the sleeve after the sleeve is inserted into or through the axle opening in the frame. In some examples, the sleeve is integral with the bracket. The sleeve creates a strong and accurate reference between the hub assembly and the bracket. In particular, the sleeve is relatively long. This enables a wider support width between the sleeve and the axle. In some examples, the sleeve and the axle form a transition fit (sometimes referred to as a slip fit) or interference fit (sometimes referred to as friction fit or press fit). The wider support width and fit create a strong radial reference between the sleeve and the axle and, thus, between the bracket and the axle. Also, when the axle is tightened, the sleeve and the bracket are axially clamped between a head of the axle and the hub. This creates a strong axial reference between the bracket and the hub assembly. As a result, the brake caliper maintains a stronger axial and radial reference to the rear hub assembly and, thus, to the brake rotor.

In some examples, the second opening is implemented as a collar clamp. For example, the brake mount can include a clamp bolt that can be screwed into the bracket to clamp the bracket at the second opening onto the post. In some examples, the clamp bolt is tightened after the bracket is installed with the hub assembly. This allows the bracket to maintain a weaker axial reference to the frame so the bracket can maintain a stronger axial reference to the rear hub assembly. Also, in some examples, the second opening is elongated in the radial direction. This allows the brake mount to compensate for distance tolerances between the centers of the first and second openings and the equivalents of the frame through-hole center and the post center. In some examples, the optimal alignment is achieved by the disclosed reference and tolerance design and the assembly sequence. As an example assembly process, first, the brake mount is assembled to the frame without tightening the sleeve nut. Second, the hub is assembled with the axle and the maximum axle torque is applied. Within this configuration, the brake mount and the hub are accurately positioned, but the loose fit between the brake mount and frame is misaligned in a way that compensates the system tolerance. Third, the sleeve nut is tightened so the misaligned state is frozen. Then, the bracket at the second opening can be fastened to the post and therefore freeze the axial alignment in the current position. Alternatively, in other examples, there may be no means of axial fixation on the post so the axial position would be maintained by the brake mount structure. This is advantageous over known brake mount systems that have little or no reference to the hub because the axial fixation to the frame causes the brake mount to bend towards the frame.

The examples disclosed herein are also advantageous for vibration management, which is an important consideration for brake system design. Resonance frequencies can cause squealing and other performance and safety issues. The structural and elastic properties of the primary loaded parts have a direct effect on such vibrations. Known brake designs include frame or adapter elements within the load path that are not optimized within the brake system context. The example brake mounts disclosed herein are configured so the load path is lead through strong references and optimized structure. The axial distance from the brake rotor to the torque support area at the second opening constitutes the leverage for twisting loads. Compared to known designs, in some examples, this distance is significantly shorter and therefore results in reduced deformation within the brake mount. The twisting loads are at least partially absorbed by the frame and therefore do not interfere in the direct load path of the brake mount. In particular, the example brake mounts result in significantly improved twisting loads on the primary loaded elements compared to known designs. Thus, the example brake mounts disclosed herein allow frame independent brake system optimization that results in improved performance, improved safety, and reduced weight and cost, including frame development, testing and manufacturing cost savings.

Turning now to the figures, FIG. 1 illustrates one example of a human powered vehicle on which the example brake mounts and associated components disclosed herein may be implemented. In this example, the vehicle is one possible type of bicycle 100, such as a mountain bicycle. In the illustrated example, the bicycle 100 includes a frame 102 and a front wheel 104 and a rear wheel 106 rotatably coupled to the frame 102. In the illustrated example, the front wheel 104 is coupled to the front end of the frame 102 via a front fork 108. In some examples, the front fork 108 includes one or more suspension components (e.g., a shock absorber) to absorb shocks or vibrations. The front wheel 104 is rotatably coupled to the front fork 108 via a front hub assembly 110. The rear wheel 106 is coupled to the frame 102 to support the rear end of the frame 102. The rear wheel 106 is rotatably coupled to the frame 102 via a rear hub assembly 112. In some examples, one or more suspension components may be coupled between the rear wheel 106 and the frame 102 to absorb shocks or vibrations. A front and/or forward riding direction or orientation of the bicycle 100 is indicated by the direction of the arrow A in FIG. 1. As such, a forward direction of movement for the bicycle 100 is indicated by the direction of the arrow A. The bicycle 100 is shown as riding on a riding surface 114. The riding surface 114 may be any riding surface such as the ground (e.g., a dirt path, a sidewalk, a street, etc.), a man-made structure above the ground (e.g., a wooden ramp), and/or any other surface.

In the illustrated example, the bicycle 100 includes a seat 116 coupled to the frame 102 (e.g., near the rear end of the frame 102 relative to the forward direction A) via a seat post 118. The bicycle 100 also includes handlebars 120 coupled to the frame 102 and the front fork 108 (e.g., near a forward end of the frame 102 relative to the forward direction A) for steering the bicycle 100. In the illustrated example, the bicycle 100 has a drivetrain 122 that includes a crank assembly 124. The crank assembly 124 is operatively coupled via a chain 126 to a sprocket assembly 128. The sprocket assembly 128 is mounted to the rear hub assembly 112. The crank assembly 124 includes at least one, and typically two, crank arms 130 and pedals 132, along with at least one front sprocket, or chainring 134. The example bicycle 100 may include a rear gear change device (e.g., a derailleur) and/or a front gear change device to move the chain 126 through different sprockets.

The example bicycle 100 of FIG. 1 includes an example brake system 136. The example brake system 136 may be used to reduce the speed of the bicycle 100. The example brake system 136 includes a front brake 138 for slowing the rotation of the front wheel 104 and a rear brake 140 for slowing the rotation of the rear wheel 106. In this example, the front and rear brakes 138, 140 are implemented as hydraulic disc brakes. The front brake 138 includes a front brake rotor 142 (sometimes referred to as a brake disc) and a front brake caliper 144. The front brake rotor 142 is coupled to and rotates with the front wheel 104 on the front hub assembly 110. In the illustrated example, the front brake caliper 144 is coupled to the front fork 108 adjacent the front brake rotor 142. When the front brake caliper 144 is actuated, the front brake caliper 144 moves one or more brake pads into engagement with the front brake rotor 142 to slow the front brake rotor 142 and, thus, slow the rotation of the front wheel 104. In the illustrated example, the brake system 136 includes a front brake actuator 146 (e.g., a lever) that is used to actuate the front brake caliper 144. The front brake actuator 146 is coupled to the handlebars 120. The front brake actuator 146 is fluidly coupled to the front brake caliper 144 via a first fluid line 148. In this example, the front brake actuator 146 is actuated by moving the front brake actuator 146 toward the grip on the handlebars 120. This actuation causes brake fluid to be pushed to the front brake caliper 144 to provide braking pressure on the front brake rotor 142. Conversely, the front brake actuator 146 is de-actuated by releasing or otherwise moving the front brake actuator 146 away from the grip, which relieves or reduces the braking pressure to the front brake caliper 144.

Similarly, the rear brake 140 includes a rear brake rotor 150 and a rear brake caliper 152. The rear brake rotor 150 is coupled to and rotates with the rear wheel 106 via the rear hub assembly 112. When the rear brake caliper 152 is actuated, the rear brake caliper 152 moves one or more brake pads into engagement with the rear brake rotor 150 to slow the rear brake rotor 150 and, thus, slow the rotation of the rear wheel 106. Similar to the front brake actuator 146, the brake system 136 includes a rear brake actuator 154 that is coupled to the handlebars 120 and used to actuate the rear brake caliper 152. The rear brake actuator 154 is fluidly coupled to the rear brake caliper 152 via a second fluid line 156. The rear brake actuator 154 and the rear brake caliper 152 operate similar to the front brake actuator 146 and the front brake caliper 144.

While in this example the front and rear brakes 138, 140 are hydraulically actuated, in other examples, the front and/or rear brakes 138, 140 may be cable actuated. For example, the rear brake actuator 154 may be coupled to the rear brake caliper 152 via a cable. When the rear brake actuator 154 is moved toward the handlebars 120, the cable is pulled to actuate the rear brake caliper 152. In the illustrated, the front and rear brake rotors 142, 150 are disposed on the left side of the front and rear wheels 104, 106 (when facing the direction A). In other examples, the front and/or rear brake rotors 142, 150 may be disposed on the right side of the front and rear wheels 104, 106, respectively.

While the example bicycle 100 depicted in FIG. 1 is a type of mountain bicycle, the example brake mounts and associated components disclosed herein can be implemented on other types of bicycles. For example, the disclosed brake mounts and associated components may be used on road bicycles, as well as bicycles with mechanical (e.g., cable, hydraulic, pneumatic, etc.) and non-mechanical (e.g., wired, wireless) drive systems. The disclosed brake mounts and associated components may also be implemented on other types of two-, three-, and four-wheeled human powered vehicles. Further, the example brake mounts and associated components can be used on other types of vehicles, such as motorized vehicles (e.g., a motorcycle, a car, a truck, etc.). The example brake mounts and associated components disclosed herein can be used with any road or trail conditions (e.g., hot, cold, wet, muddy, snowy, etc.).

Figure 3:
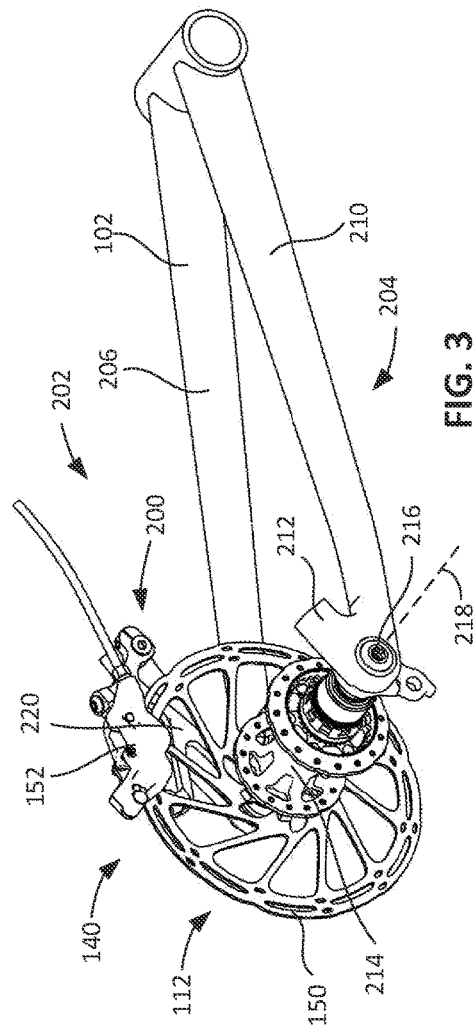
FIGS. 2 and 3 are perspective views of an example rear hub assembly and an example brake mount on a rear frame portion of the example bicycle of FIG. 1.
Figure 2:
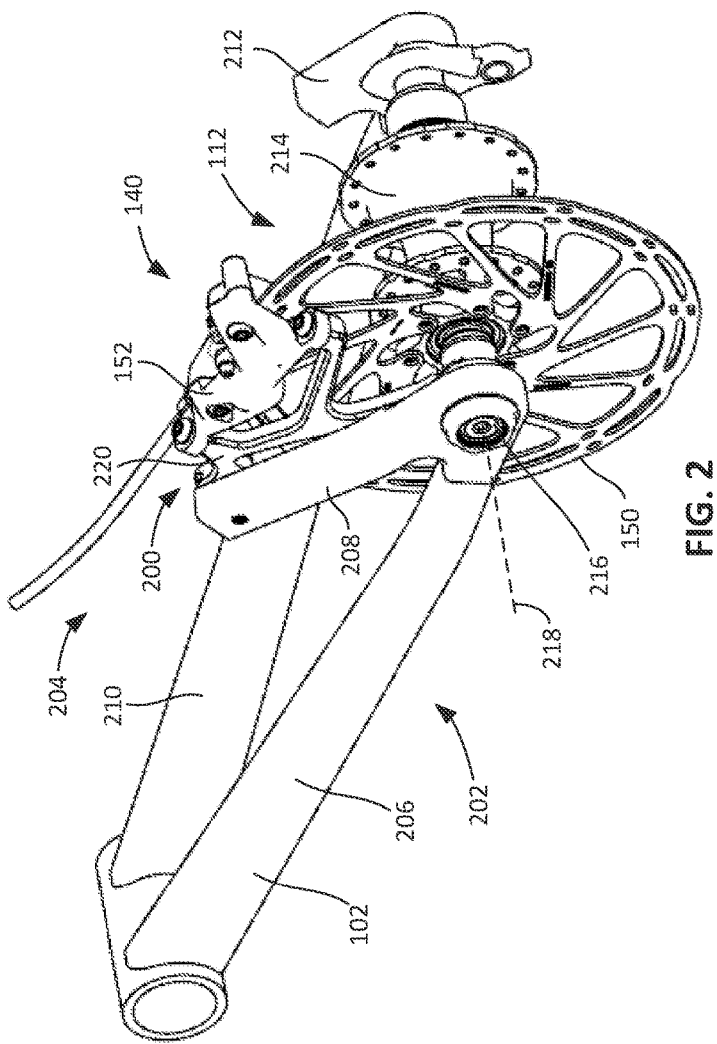

FIGS. 2 and 3 are perspective views of a rear portion of the frame 102 of the bicycle 100 (FIG. 1), showing the example rear hub assembly 112, the example rear brake 140, and an example brake mount 200 used to position the rear brake caliper 152 relative to the rear brake rotor 150. The example brake mount 200 may also be referred to as a brake mount assembly, brake adapter, or brake adapter assembly. The spokes and tire for the rear wheel 106 (FIG. 1) have been removed for clarity.

In the illustrated example, the frame 102 of the bicycle 100 (FIG. 1) has a left frame portion 202 and a right frame portion 204. The left frame portion 202 has a left chainstay 206 and a left seatstay 208, and the right frame portion 204 has a right chainstay 210 and a right seatstay 212. The left and right frame portions 202, 204 can also be referred to as frame triangles. The rear hub assembly 112 is disposed between the left and right frame portions 202, 204.

In the illustrated example, the rear hub assembly 112 includes a hub 214 and an axle 216 about which the hub 214 rotates. The rear wheel 106 (not shown in FIGS. 2 and 3, but shown in FIG. 1) is coupled to the hub 214 via spoke-attachment flanges. The hub 214 is disposed between the left and right frame portions 202, 204. The axle 216 extends through the left and right frame portions 202, 204 (e.g., at an intersection of the left chainstay and seatstay 206, 208 and an intersection of the right chainstay and seatstay 210, 212) and through the hub 214. The rear brake rotor 150 is coupled to the hub 214 (e.g., via one or more threaded fasteners) and rotates with the rear wheel 106 (FIG. 1) about the axle 216. As such, the axle 216 defines a rotational axis 218 about which the hub 214 and the rear brake rotor 150 rotate. The rear brake rotor 150 may be considered part of the rear hub assembly 112. The rear brake caliper 152 can be actuated (e.g., via hydraulic pressure or a cable) to move brake pads into engagement with the rear brake rotor 150, thereby slowing the rear wheel 106 to slow the bicycle 100.

In the illustrated example, the example brake mount 200 includes a bracket 220. The rear brake caliper 152 is coupled to the bracket 220, and the bracket 220 is coupled to the bicycle 100 in one or more locations, as disclosed in further detail herein. As such, the bracket 220 couples the rear brake caliper 152 to the bicycle 100. The bracket 220 accurately positions the rear brake caliper 152 relative to the rear brake rotor 150 so that the brake pads are axially and radially aligned with the rear brake rotor 150. In some examples, the brake mount 200 is a universal brake mount, which can be used to couple different types (e.g., different brands, shapes, etc.) of brake calipers to the bicycle 100.

Figure 4:
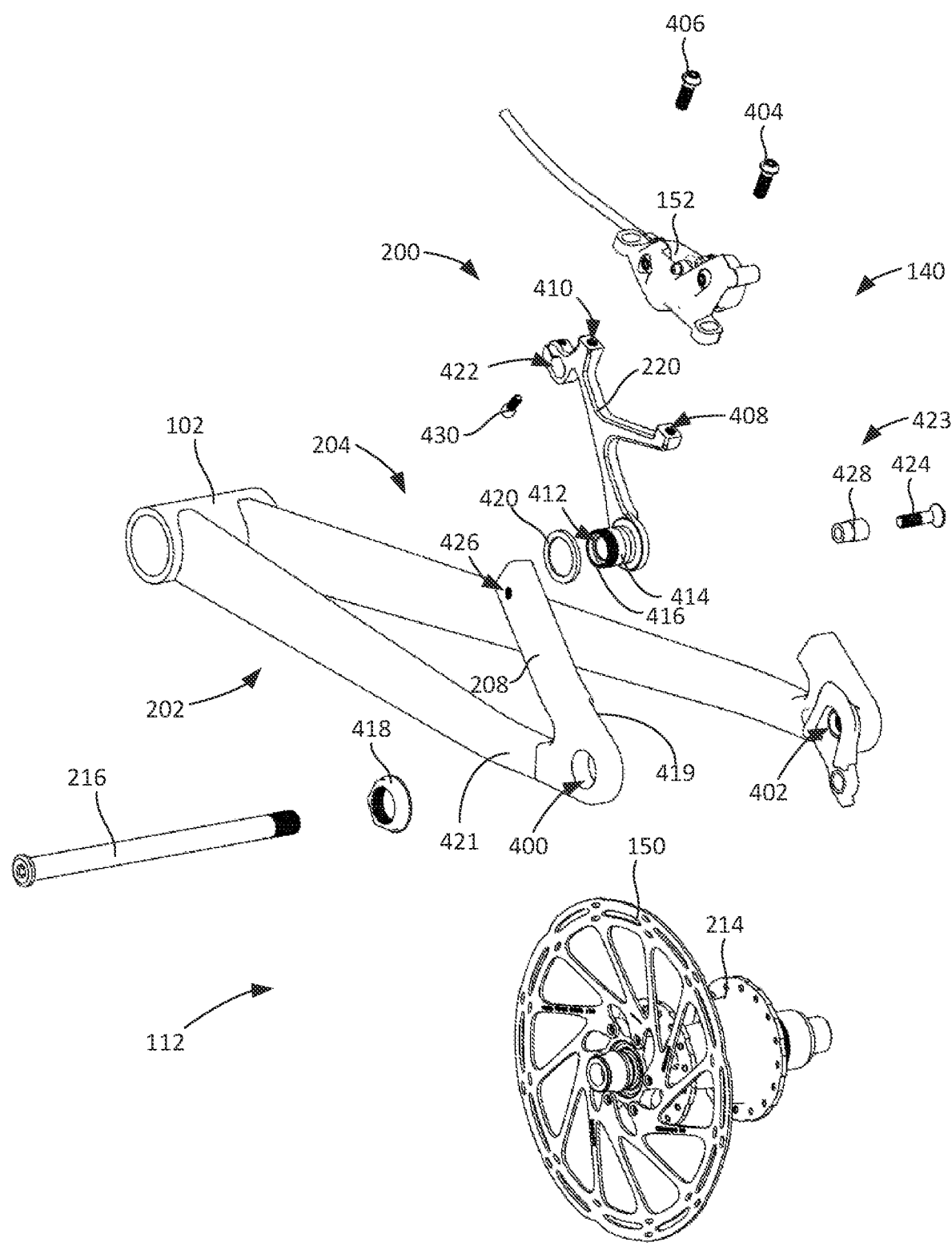
FIG. 4 is an exploded view of the example rear hub assembly and the example brake mount of FIG. 2.

FIG. 4 is an exploded view of the example rear hub assembly 112, the example rear brake 140, and the example brake mount 200 from the same perspective view as FIG. 2. As shown in FIG. 4, the left frame portion 202 has a first axle opening 400 and the right frame portion 204 has a second axle opening 402. In some examples, the first axle opening 400 is a through-hole, and the second axle opening 402 is threaded. To install the rear hub assembly 112, the hub 214 with the rear brake rotor 150 are disposed between the left and right frame portions 202, 204. Then the axle 216 is inserted through the first axle opening 400, through the hub 214 and the rear brake rotor 150, and screwed into the second axle opening 402. In other examples, the second axle opening 402 may also be a through-hole. In such an example, a nut or other threaded fastener can be screwed onto the end of the axle 216 outboard of the right frame portion 204.

As described above, because the left and right frame portion 202, 204 are relatively long, and because of manufacturing tolerances, the first and second axle openings 400, 402 may not be perfectly aligned. Therefore, bicycle manufacturers often enlarge the first axle opening 400 to enable the axle 216 to be slightly angled in the first axle opening 400 to compensate for the potential misalignment between the first and second axle openings 400, 402. Known bicycles often mount the brake caliper to the left seatstay 208. However, because the rear hub assembly 112 (along with the rear brake rotor 150) is slightly off-axis relative to the frame 102, the brake pads may not be parallel to the rear brake rotor 150. Therefore, users are required to manually adjust the position of the brake caliper using shims and spacers, which is a time consuming and tedious process. As disclosed in further detail herein, the example brake mount 200 creates a strong or absolute axial and radial reference between the rear brake caliper 152 and the rear hub assembly 112 instead of the frame 102. This allows little or no adjustability relative to the hub rear hub assembly 112. As a result, the brake mount 200 more accurately positions the rear brake caliper 152 relative to the rear brake rotor 150.

In this example, the rear brake caliper 152 is coupled to the bracket 220 by a set of threaded fasteners 404, 406 (e.g., bolts). In the illustrated example, the bracket 220 includes bores 408, 410 (e.g., threaded bores), which may also be referred to as rear and front caliper mounts. The threaded fasteners 404, 406 can be inserted through openings in the rear brake caliper 152 and screwed into the bores 408, 410 to couple the rear brake caliper 152 to the bracket 220. This allows the rear brake caliper 152 to be easily coupled to and decoupled from the bracket 220. Any brake caliper having the same bolt-hole configuration can be coupled to the bracket 220. Therefore, the bracket 220 is considered a universal brake mount or adapter. In other examples, the rear brake caliper 152 can be coupled to the bracket 220 by more or fewer threaded fasteners. Additionally or alternatively, the rear brake caliper 152 can be coupled to the bracket 220 via other fastening mechanisms (e.g., rivets, latches, friction fit, etc.).

In the illustrated example, the bracket 220 has a first opening 412, which may be referred to as an axle opening. The first opening 412 is to receive the axle 216 of the rear hub assembly 112. In particular, when bracket 220 is installed on the bicycle 100, the axle 216 extends through the first opening 412. Therefore, the first opening 412 forms a first point of contact between the bracket 220 and the bicycle 100 and, thus, between the rear brake caliper 152 and the bicycle 100. This first point of contact may also be referred to as the rear bracket-to-bicycle attachment point.

In the illustrated example, the bracket 220 includes a sleeve 414. The sleeve 414 extends from the outboard facing side of the bracket 220 and is coaxial with the first opening 412. When the bracket 220 is installed on the bicycle 100, the sleeve 414 extends into the first axle opening 400, and the axle 216 extends through the sleeve 414. In the illustrated example, a distal end 416 of the sleeve 414 is threaded. The brake mount 200 includes a nut 418. After the sleeve 414 is inserted into (e.g., through) the first axle opening 400, the nut 418 can be threadably coupled to (e.g., screwed onto) the distal end 416 of the sleeve 414. As such, in this example, the nut 418 is on an outboard side 421 of the frame 102 and the bracket 220 is on an inboard side 419 of the frame 102. In this example, the sleeve 414 extends through the first axle opening 400 when the bracket 220 is installed on the bicycle 100. However, in other examples, the sleeve 414 may be sized to extend only partially into the first axle opening 400, such that the distal end 416 is not outboard of the left frame portion 102. In such an example, the nut 418 may be disposed at least partially in the first axle opening 400. In some examples, the brake mount 200 includes a washer 420 (e.g., a sleeve, spacer) that is disposed around the sleeve 414 and clamped between the bracket 220 and the left frame portion 202.

In the illustrated example, the bracket 220 has a second opening 422, which may be referred to as a post opening. The brake mount 200 includes a post 423 that is to be coupled to the inboard side 419 of the left frame portion 202, such that the post 423 extends inboard. The second opening 422 is to be disposed around and coupled to the post 423. In this example, the post 423 is implemented as a bolt 424, referred to herein as a bracket bolt 424. When assembled, the bracket bolt 424 extends through the second opening 422 and is screwed into a threaded opening 426 in the left seatstay 208. In some examples, the brake mount 200 includes a sleeve 428 that can be disposed around the bracket bolt 424. The sleeve 428 increases the contact area between the bracket 220 and the bracket bolt 424 and, thus, between the bracket 220 and the frame 102. The brake mount 220 includes means to reduce an inner diameter of the second opening 422, such that the bracket 220 can be clamped onto the post 423. In this example, the second opening 422 is implemented as a collar clamp, which is shown in further detail herein. The bracket 220 includes a clamp bolt 430 that can be threadably inserted (e.g., screwed) into the bracket 220 to clamp the bracket 220 at the second opening 422 onto the bracket bolt 424 (and the sleeve 428). In other examples, the brake mount 200 can include other structures to reduce the inner diameter of the second opening 422. Therefore, the second opening 422 forms a second point of contact between the bracket 220 and the bicycle 100 and, thus, between the rear brake caliper 152 and the bicycle 100. This second point of contact may also be referred to as the front bracket-to-bicycle attachment point.

Figure 5A:
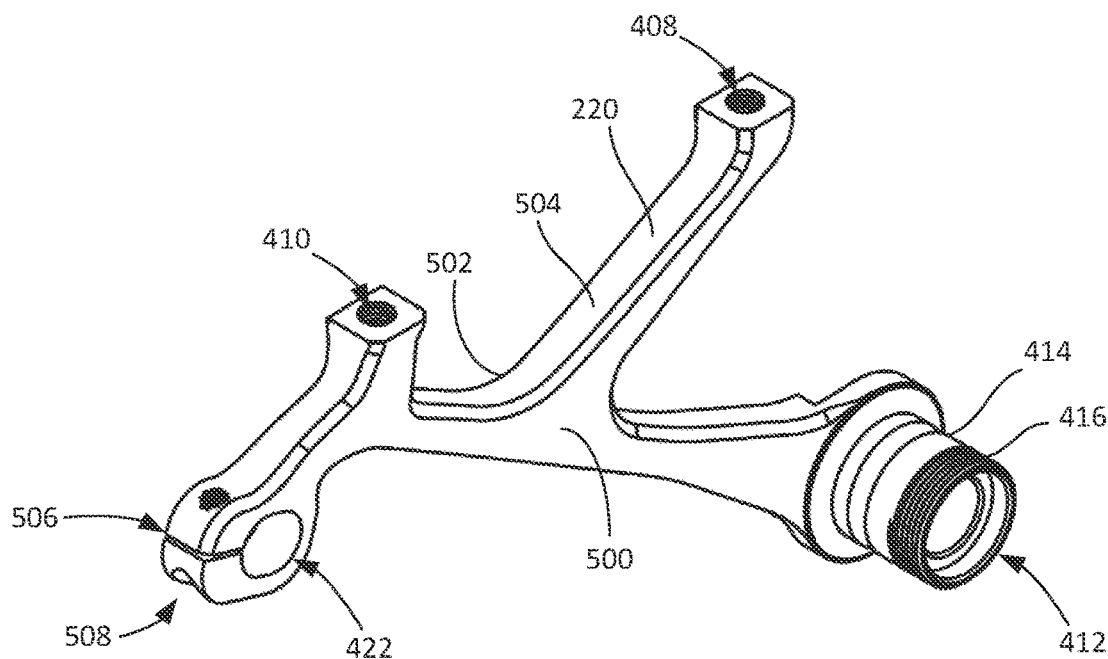
FIG. 5A is a perspective view of an example bracket and an example sleeve of the example brake mount of FIG. 4.

FIG. 5A is a perspective view of the example bracket 220 and the example sleeve 414. In the illustrated example, the bracket 220 has a first side 500, a second side 502 opposite the first side 500, and an outer peripheral edge 504 between the first and second sides 500, 502. When the bracket 220 is coupled to the bicycle 100, the first side 500 faces outboard and the second side 502 faces inboard. The first and second openings 412, 422 extend through the bracket 220 between the first and second sides 500, 502. In some examples, the bracket 220 is a single unitary part or component (e.g., a monolithic structure). For example, the bracket 220 can be machined from a single piece of metal (e.g., aluminum). In other examples, the bracket 220 can be constructed of multiple parts or components that are coupled together.

In the illustrated example, the sleeve 414 extends from the first side 500 of the bracket 220 and is coaxial with the first opening 412. In this example, the sleeve 414 is integral with the bracket 220. For example, the bracket 220 and the sleeve 414 can be constructed of a single unitary part or component (e.g., a monolithic structure). Therefore, in this example, the first opening 412 extends through the sleeve 414 and the bracket 220. In some examples, the bracket 220 and the sleeve 414 are constructed of metal, such as aluminum. Additionally or alternatively, the bracket 220 and the sleeve 414 can be constructed of other materials. In other examples, the sleeve 414 can be a separate part or component that is coupled to or disposed relative to the bracket 220, an example of which is disclosed in connection with FIGS. 14 and 15. In the illustrated example, the distal end 416 of the sleeve 414 is threaded. The nut 418 (FIG. 4) can be screwed onto the distal end 416 of the sleeve 414.

As shown in FIG. 5A, the bracket 220 has a gap 506 that extends between the first and second sides 500, 502, and extends between the second opening 422 and the outer peripheral edge 504. The bracket 220 also has a fastener opening 508 extending into the bracket 220 and across the gap 506. The clamp bolt 430 (FIG. 4) can be inserted and screwed into the fastener opening 508. When the clamp bolt 430 is tightened, the size of the gap 506 is reduced or closed, which reduces the size of the second opening 422, thereby clamping the bracket 220 onto the bracket bolt 424 and/or the sleeve 428 (FIG. 4). Therefore, the second opening 422, the gap 506, and the fastener opening 508 form a collar clamp. In this example, the second opening 422 is not threaded. Instead, the second opening 422 is clamped onto the bracket bolt 424 and/or the sleeve 428. This enables the bracket 220 to maintain a stronger axial and radial reference to the rear hub assembly 112 (FIG. 4) than to the frame 102 (FIG. 4).

In the illustrated example, the bracket 220 includes the bores 408, 410. The bores 408, 410 are to receive the threaded fasteners 404, 406 (FIG. 4) to couple the rear brake caliper 152 (FIG. 4) to the bracket 220. The bores 408, 410 can be sized (e.g., having a specific diameter and/or thread size) and spaced apart according to a universal caliper standard, such that different types of calipers can be coupled to the bracket 220.

Figure 5B:
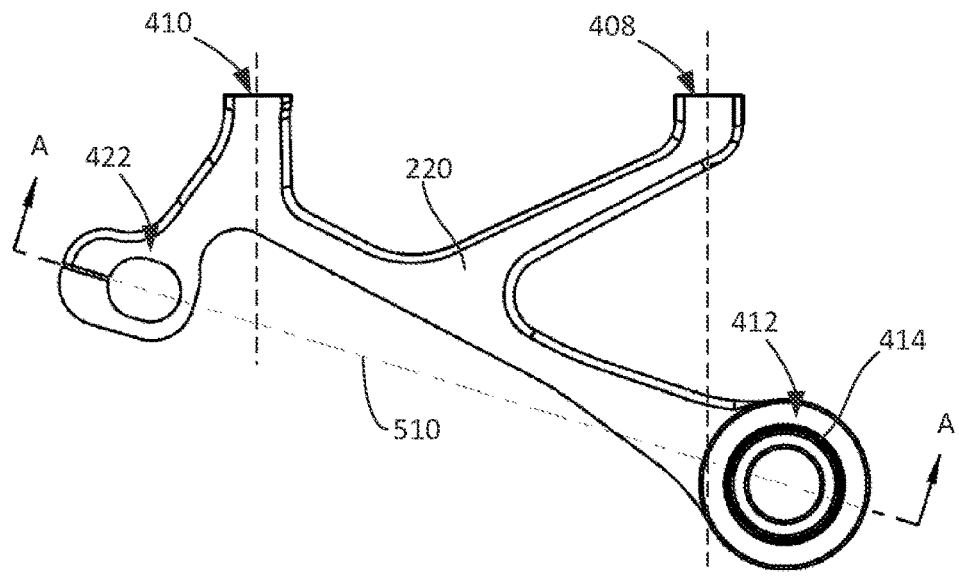
FIG. 5B is a side view of the example bracket and the example sleeve of FIG. 5A.

FIG. 5B is a side view of the example bracket 220 and the example sleeve 414. A plane 510 that extends into the figure is labeled in FIG. 5B. The plane 510 represents a mounting plane where the bracket 220 is coupled to the bicycle 100, i.e., at the first opening 412 and at the second opening 422. The plane 510 bisects the first and second openings 412, 422. As shown in FIG. 5B, axes of the bores 408, 410 intersect the plane 510 between the first and second openings 412, 422. As such, the second opening 422 (the front bracket-to-bicycle attachment point) is radially outward of the second threaded bore 410 (the forward caliper mount) relative to the first opening 412 (the rear bracket-to-bicycle attachment point). This results in reduced loads at the interface between the second opening 422 and the bracket bolt 424 (FIG. 4) during braking compared to a configuration where the second threaded bore 410 (the forward caliper mount) is radially outward of the second opening 422 (the second attachment portion).

Figure 5C:
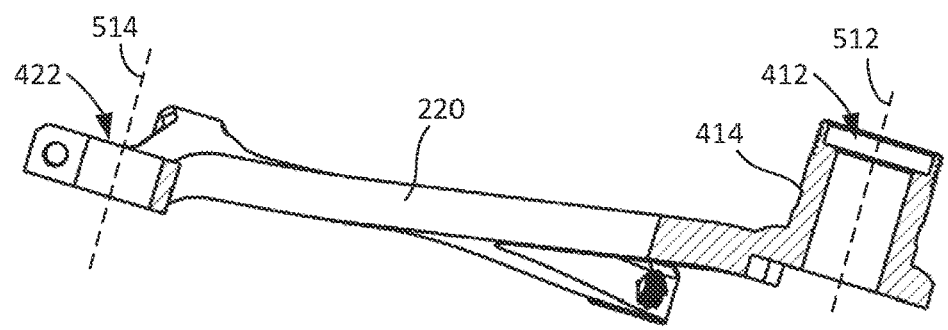
FIG. 5C is a cross-sectional view of the example bracket and the example sleeve taken along line A-A of FIG. 5B.

FIG. 5C is a cross-sectional view of the example bracket 220 and the example sleeve 414 taken along line A-A (along the plane 510) of FIG. 5B. In the illustrated example, a central axis 512 of the first opening 412 is parallel to a central axis 514 of the second opening 422. Therefore, the first and second openings 412, 422 are parallel. When the bracket 220 is installed with the rear hub assembly, the central axis 512 of the first opening 412 is coaxial with or the same as the rotational axis 218 (FIG. 2).

Figure 5D:
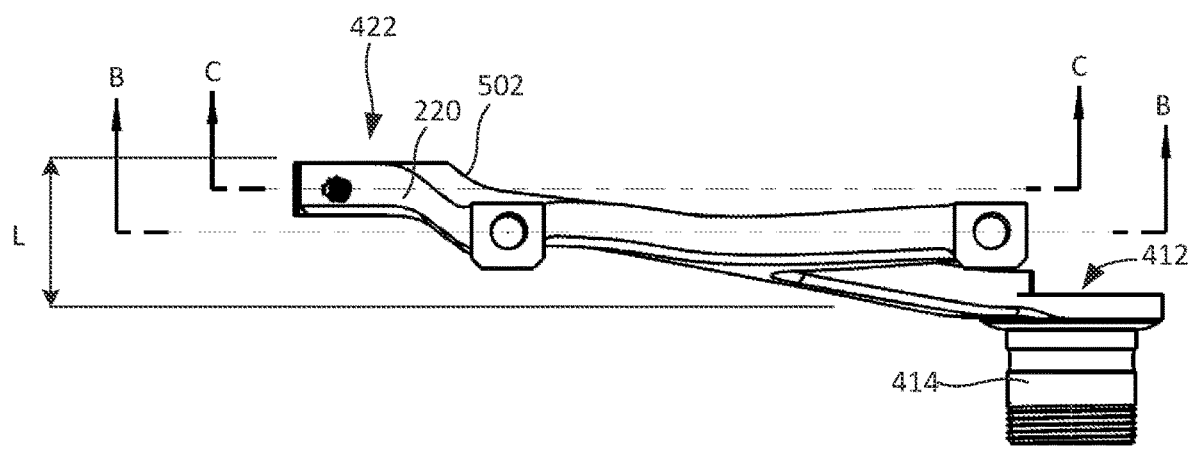
FIG. 5D is a top view of the example bracket and the example sleeve of FIG. 5A.
Figure 5E:
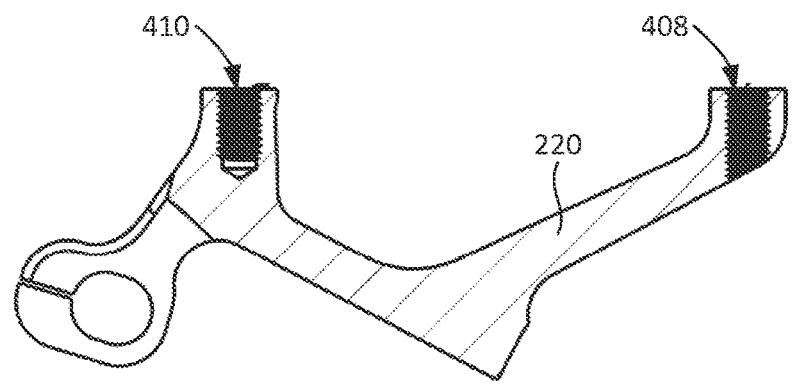
FIG. 5E is a cross-sectional view of the example bracket taken along line B-B of FIG. 5D.
Figure 5F:
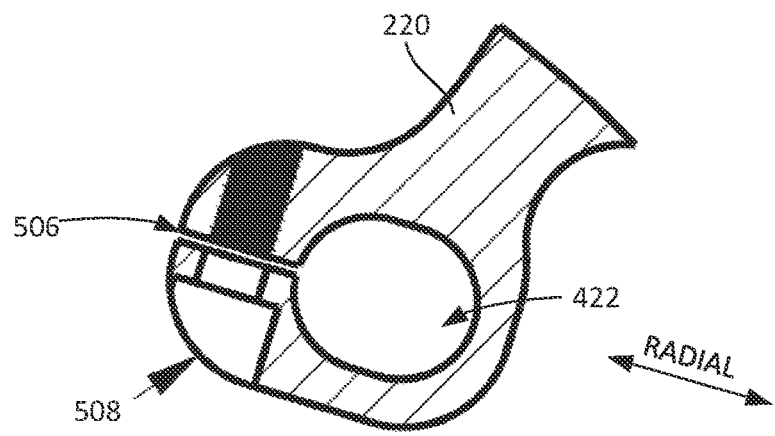
FIG. 5F is a cross-sectional view of the example bracket taken along line C-C of FIG. 5D.

FIG. 5D is a top view of the example bracket 220 and the example sleeve 414. A shown in FIG. 5D, the bracket 220 is angled or curved inboard from the first opening 412 to the second opening 422. As such, the first and second openings 412, 422 are axially offset. The first side 502 at the first opening 412 and the second opening 422 are axially offset by a distance L. In some examples, the distance L is about 12 millimeters (mm) (e.g., ±1 mm). In other examples, the distance L may be greater or less than 12 mm. FIG. 5E is a cross-sectional view of the example bracket 220 taken along line B-B of FIG. 5D. FIG. 5E shows the bores 408, 410 extending into the bracket 220. FIG. 5F is a cross-sectional view of the example bracket 220 taken along line C-C of FIG. 5D. As shown in FIG. 5F, the second opening 422 is elongated in the radial direction relative to the rotational axis 218 (FIG. 2) and/or the central axis 510 (FIG. 5C) of the first opening 412 (FIG. 5A). This enables the bracket 220 to be positioned or moved radially relative to the bracket bolt 424 (FIG. 4) to maintain a strong or absolute reference to the rear hub assembly 112 (FIG. 4). As shown in FIG. 5F, the fastener opening 508 extends into the bracket 220 and across the gap 506.

Figure 6:
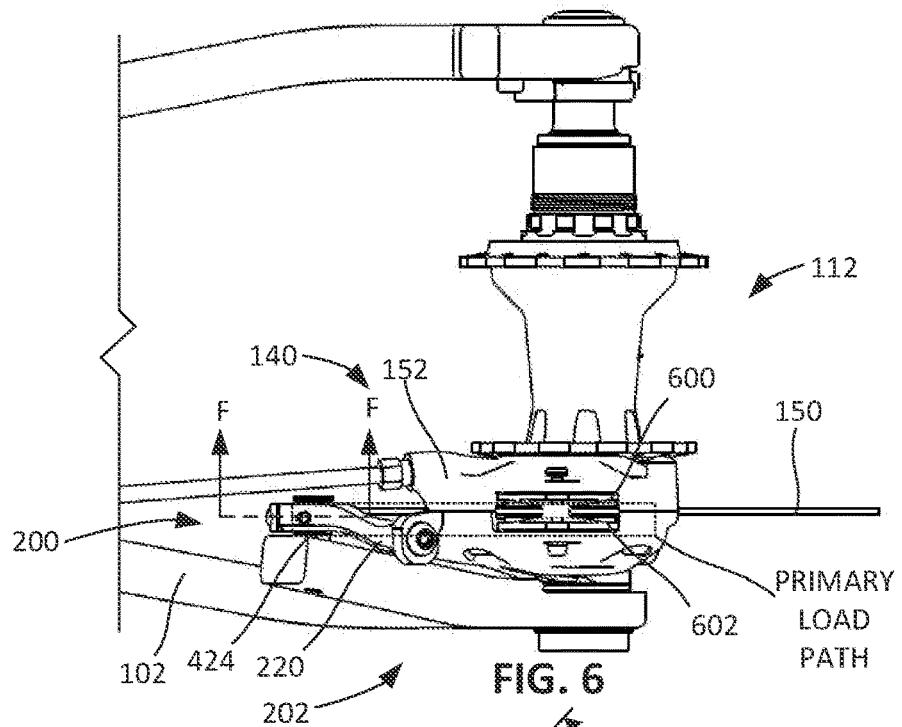
FIG. 6 is a top view of the example rear hub assembly and the example brake mount on the example bicycle as shown in FIGS. 2 and 3.

FIG. 6 is a top view of the hub assembly 112, the rear brake 140, and the brake mount 200 on the frame 102. As shown in FIG. 6, the brake mount 200 disposes the rear brake caliper 152 inboard of the left frame portion 202 and aligned with the rear brake rotor 150. In the illustrated example, the rear brake caliper 152 has an inboard brake pad 600 and an outboard brake pad 602. In some examples, both of the brake pads 600, 602 are moveable. In other examples, one of the brake pads 600, 602 is fixed and the other one of the brake pads 600, 602 is moveable. When the rear brake caliper 152 is actuated, one or both of the brake pads 600, 602 move into engagement with the rear brake rotor 150. The brake mount 200 axially aligns the rear brake caliper 152 with the rear brake rotor 150 so that the brake pads 600, 602 are positioned parallel to and on opposite sides of the rear brake rotor 150. The brake mount 200 has a stronger axial reference to the rear hub assembly 112 than the frame 102. As a result, if the rear hub assembly 112 shifts in the axial direction relative to the frame 102, the brake pads 600, 602 remain axially aligned with the rear brake rotor 150. On known bicycles, the rear brake caliper has a stronger reference to the frame 102. As such, if the rear hub assembly 112 shifts in the axial direction relative to the frame 102, the brake caliper (and, thus, the brake pads) can become offset from the rear brake rotor 150. In some situations, one brake pad will constantly ride on the rear brake rotor 150.

The primary load path is labeled in FIG. 6. As shown in FIG. 6, the contact area between the bracket 220 on the bracket bolt 424 is located through or near a plane of the rear brake rotor 150. In other words, the front contact between the bracket 220 and the left frame portion 202 is substantially axially aligned with the rear brake rotor 150. This minimizes elastic deformation within the primary loaded parts, and significantly improves the twisting loads on the primary loaded elements. This configuration also helps reduce vibration and noise compared to known brake mount designs.

Figure 7:
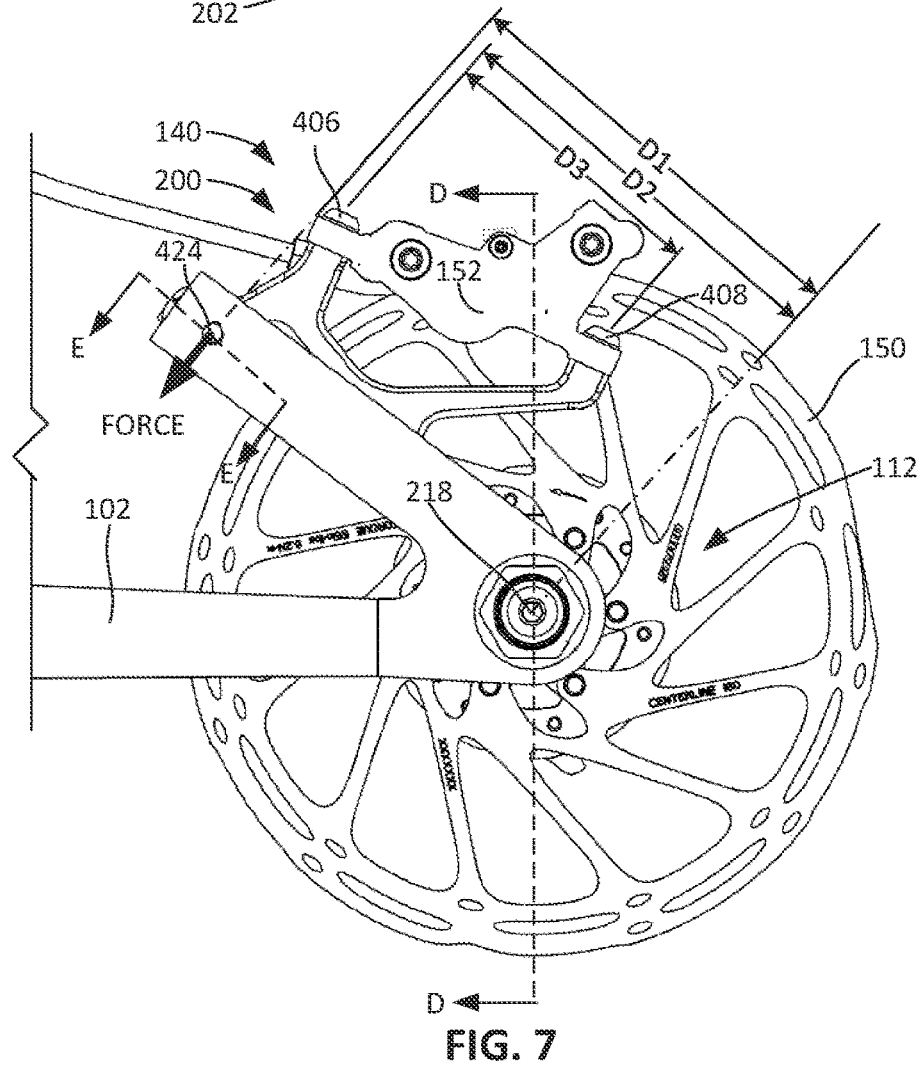
FIG. 7 is a side view of the example rear hub assembly and the example brake mount on the example bicycle as shown in FIGS. 2 and 3.

FIG. 7 is a side view (facing inboard) of the hub assembly 112, the rear brake 140, and the brake mount 200 on the frame 102. The brake mount 200 radially aligns the rear brake caliper 152 with the rear brake rotor 150 so that the brake pads 600, 602 (FIG. 6) are a radially aligned (relative to the rotational axis 218 of the rear brake rotor 150) with the brake track on the rear brake rotor 150. The brake mount 200 has a stronger radial reference to the rear hub assembly 112 than the frame 102. As a result, if the rear hub assembly 112 shifts in the radial direction relative to the frame 102, the brake pads 600, 602 remain radially aligned with the brake track on the rear brake rotor 150.

Braking forces from the rear brake caliper 152 are applied to the bracket bolt 424 in the tangential direction, as shown by the arrow labeled FORCE. Distances D1, D2, and D3 are labeled in FIG. 7. D1 is the radial distance between the rotational axis 218 and the bracket bolt 424 (the front bracket-to-bicycle attachment point). In some examples, the distance D1 is at least about 110 millimeters (mm) (e.g., ±1 mm). In other examples, the distance D1 can be smaller than 110 mm. D2 is the radial distance between tangential lines extending through the rotational axis 218 and second threaded fastener 406 (is the front caliper mount). D3 is the radial distance between tangential lines extending through the first and second threaded fasteners 406, 408 (the front and rear caliper mounts). As shown in FIG. 7, D1 is greater than D2. As such, the front bracket-to-bicycle attachment point (at the bracket bolt 424) is further, in the radial direction, than the front caliper mount (the second threaded fastener 406). This results in less load on the front bracket-to-bicycle attachment point (at the bracket bolt 424) than if the front bracket-to-bicycle attachment point was closer to the rotational axis 218. In some examples, to minimize support load in the tangential direction, the distance D1 is about 115-125 millimeters (mm) (e.g., ±5 mm). In other examples, the distance D1 can be larger or smaller.

Figure 8:
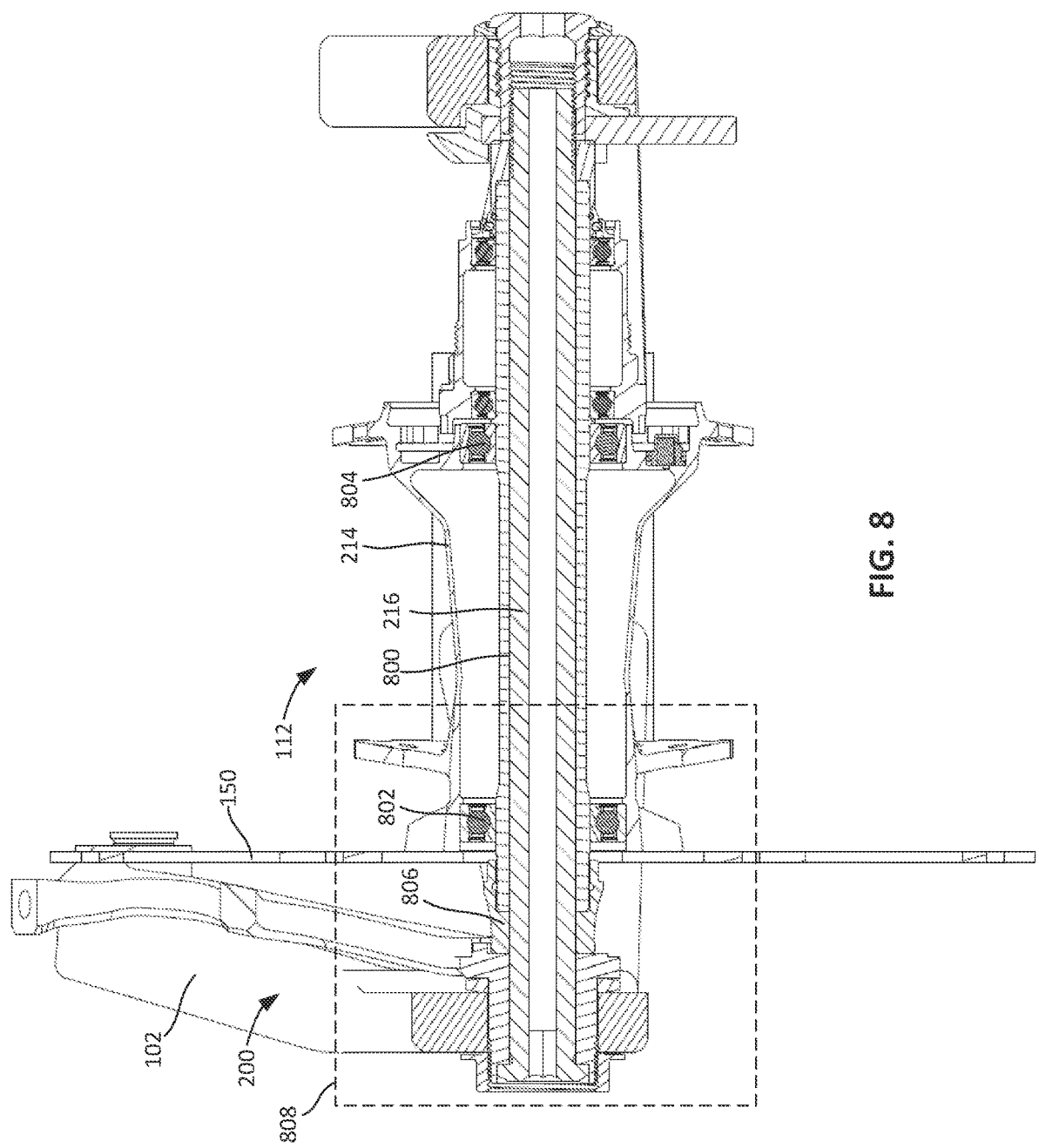
FIG. 8 is a cross-sectional view of the example rear hub assembly and the example brake mount on the example bicycle taken along line D-D of FIG. 7.

FIG. 8 is a cross-sectional view of the frame 102, the rear hub assembly 112, and the brake mount 200 taken along line D-D of FIG. 7. The rear brake caliper 152 is not shown in FIG. 8. As shown in FIG. 8, the rear hub assembly 112 includes an inner spindle 800. The axle 216 extends through and is engaged (via an interference fit) with the inner spindle 800. The rear hub 214 rotates about the inner spindle 800 via bearings 802, 804. The rear brake rotor 150 is rigidly coupled to the rear hub 214 (e.g., via one or more fasteners). As such, the rear brake rotor 150 rotates with the rear hub 214 about the inner spindle 800 and the axle 216. In the illustrated example, the hub assembly 112 includes a hub end cap 806 on the end of the rear hub 214.

Figure 9:
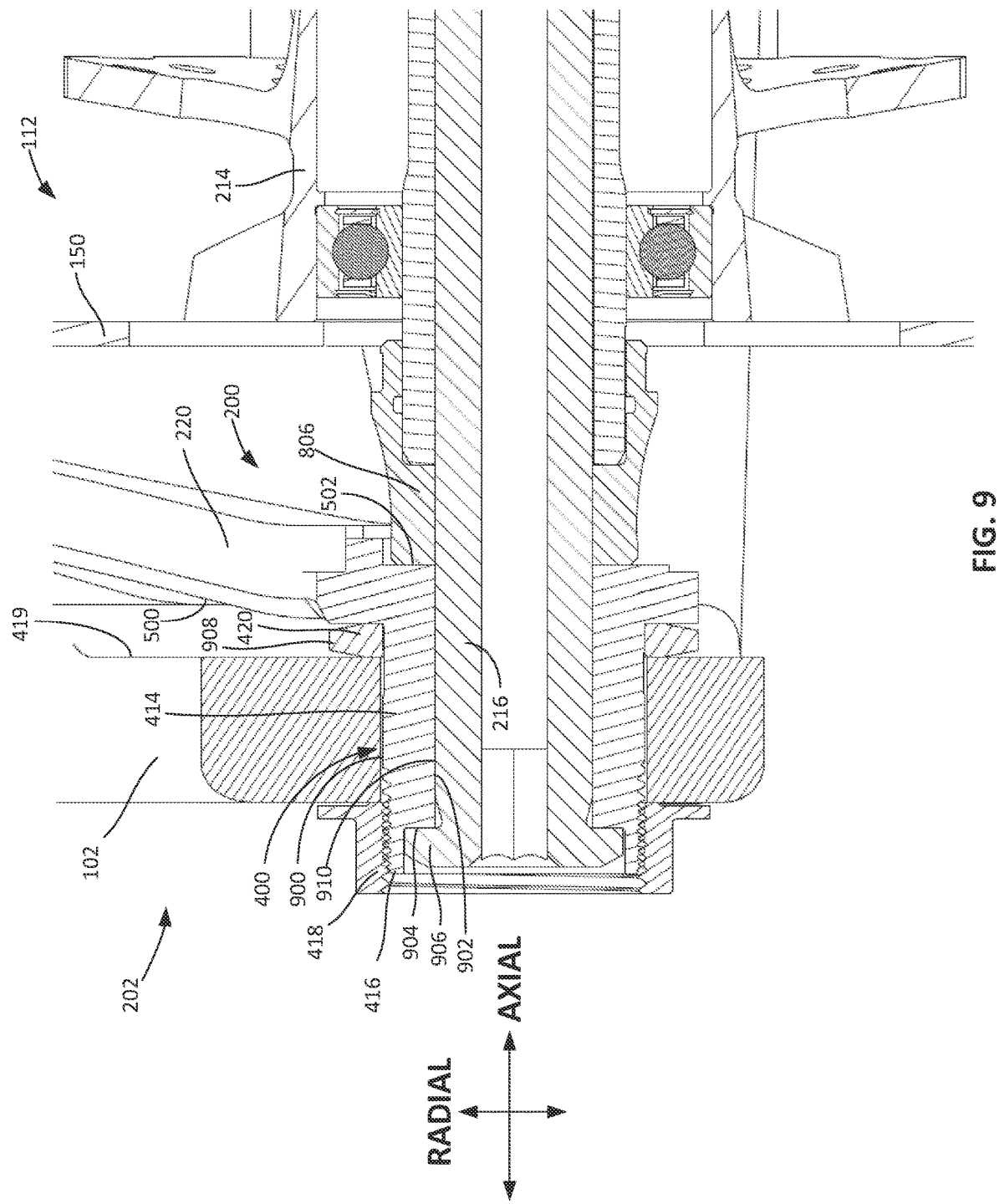
FIG. 9 is an enlarged view of the callout in FIG. 8.

FIG. 9 is enlarged view of the callout 808 from FIG. 8. In the illustrated example, the bracket 220 is disposed inboard of the left frame portion 202 of the frame 102. The sleeve 414, which is coupled to or integral with the bracket 220, extends through the first axle opening 400 in the left frame portion 202. In the illustrated example, the sleeve 414 is longer than the first axle opening 400. As such, a portion of the sleeve 414 is inboard of the left frame portion 202 and the distal end 416 of the sleeve 414 is outboard of the left frame portion 202. The axle 216 extends through the sleeve 414. Therefore, in this example, the axle 216 does not contact the left frame portion 202.

In the illustrated example, the second side 502 (the inboard facing side) of the bracket 220 is engaged with the hub end cap 806. The sleeve 414 has an outer surface 900 and an inner surface 902. The inner surface 902 of the sleeve 414 near the distal end 416 has a shoulder 904 (e.g., a ledge, a step, etc.). In the illustrated example, the axle 216 has a head 906 that is engaged with the shoulder 904. When the axle 216 is tightened (e.g., screwed into the second axle opening 402 (FIG. 4)), the bracket 220 and the sleeve 414 are axially clamped between the head 906 of the axle 216 and the hub end cap 806. This axially secures the bracket 220 and the sleeve 414 relative to the rear hub 214, the axle 216, and the rest of the rear hub assembly 112, including the rear brake rotor 150. The axle 216, the bracket 220 and the sleeve 414, and the hub end cap 806 can be constructed of metal. This metal-to-metal interface and dimensional surface properties (e.g., larger surface area) creates a strong planar reference between the axle 216, the sleeve 414, and the hub end cap 806. This results in a strong axial reference between the parts. Therefore, even if the rear hub assembly 112 is misaligned with the frame 102, the bracket 220 remains in the same axial position relative to the rear hub assembly 112 and, thus, the rear brake caliper 152 (FIG. 1) remains in the same axial position relative to the rear brake rotor 150.

In the illustrated example, the nut 418 is threadably coupled to the distal end 416 of the sleeve 414. The washer 420 is disposed between the first side 500 of the bracket 220 and the inboard side 419 of the left frame portion 202. When the nut 418 is tightened, the frame 102, the washer 420, the bracket 220, and the rear hub assembly 112 are axially clamped or secured. In some examples, the washer 420 is constructed of a compliant material (e.g., a material that is elastically deformable). For example, the washer 420 can be constructed of plastic and/or rubber. Therefore, when the nut 418 is tightened, the washer 420 may slightly compress. The washer 420 also has relatively little surface area contact with the adjacent parts. This limited contact, and the plastic-to-metal interface, results in a weaker planar reference between the hub assembly 112 and the frame 102 and, thus, a weaker axial reference between the bracket 220 and the frame 102. However, even if the rear hub assembly 112 shifts or moves axially relative to the frame 102, the bracket 220 remains axially fixed relative to the rear hub assembly 112, which ensures the rear brake caliper 152 remains axially aligned with the rear brake rotor 150.

Figure 10:
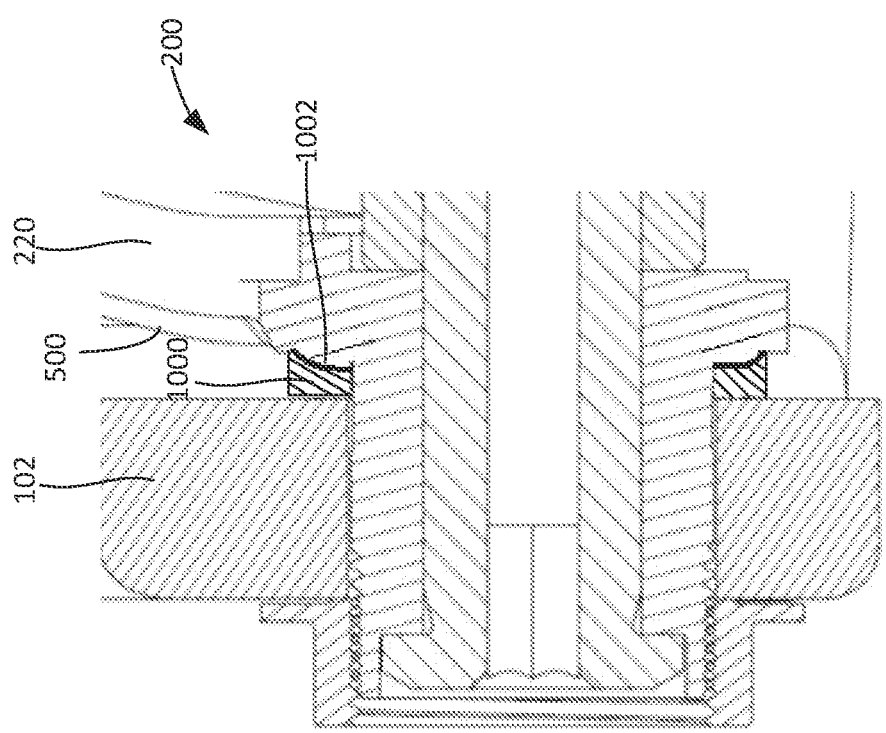
FIG. 10 shows an alternative example washer that can be used with the example rear hub assembly and brake mount of FIG. 9.

In some examples, an outer peripheral edge 908 of the washer 420 is tapered or angled, as shown in FIG. 9. The tapered shaped increases the surface pressure on the washer 420 so that it can more easily deform while mounting. The tapered shape also weakens the influence of the frame 102 so the bracket 220 and the sleeve 414 can remain oriented relative to the rear hub 214 and the axle 216. In other examples, the washer 420 can have a different shape. For example, referring briefly to FIG. 10, FIG. 10 shows an alternative washer 1000 that can be used with the brake mount 200. In the illustrated example, the washer 1000 has a concave or spheric surface 1002 that matches or corresponds to the first side 500 of the bracket 220. This spheric shape enables the bracket 220 to rotate or tilt relative to the frame 102 (e.g., in one or more directions) and, thus, maintain a weaker axial reference to the frame 102. In other examples, washer may not be used. Instead, the first side 500 of the bracket 220 can be in direct contact with the inboard side 419 of the left frame portion 202.

Referring back to FIG. 9, the example brake mount 200 also creates a strong radial reference between the bracket 220 and the rear hub assembly 112. The sleeve 414 is relatively long and, therefore, has a wider support width with the axle 216. The axle 216 and the sleeve 414 (and, thus, the bracket 220) can have a relatively tight fit. For example, the inner surface 902 of the sleeve 414 and an outer surface 910 of the axle 216 may form a transition fit (sometimes referred to as a slip fit) or an interference fit (sometimes referred to as a press fit or a friction fit). The wider support width and the fit result in a relatively strong radial reference between the bracket 220 and the rear hub assembly 112. As such, the rear brake caliper 152 (FIG. 4) remains in the same radial position relative to the rear brake rotor 150. However, the sleeve 414 may have a relatively loose fit in the first axle opening 400. For example, the first axle opening 400 and the sleeve 414 may form a clearance fit. This loose fit with narrow support width achieves a weaker reference for tolerance compensation. In particular, this allows some radial movement between the axle/sleeve and the frame 102, which is advantageous when installing the hub assembly because the first and second axle openings 400, 402 may not be perfectly aligned. Therefore, in some examples, the radial fit between the first axle opening 400 and the axle 216 is tighter than the radial fit between the sleeve 414 and the frame 102. Further, in some examples, the axial length of the radial fit between the first axle opening 400 and the axle 216 is longer than the axial length of the radial fit between the sleeve 414 and the frame 102.

Figure 11:
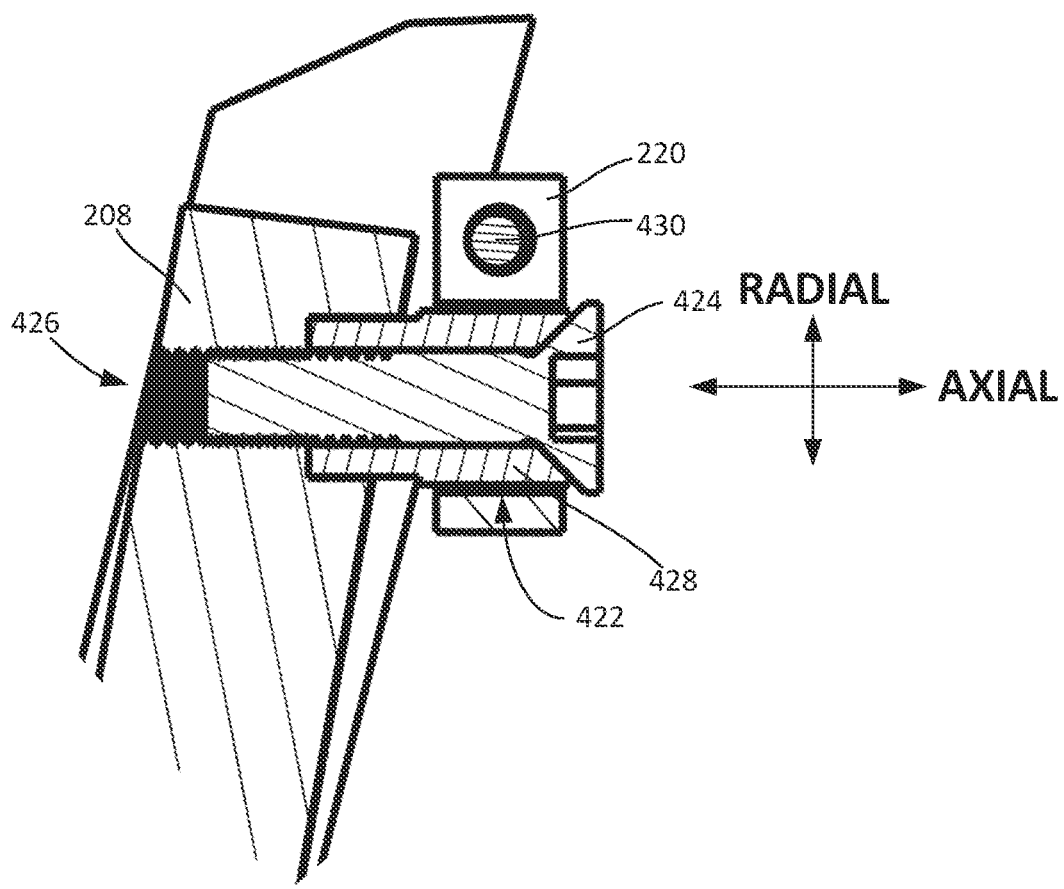
FIG. 11 is a cross-sectional view of the example frame and the example bracket taken along line E-E of FIG. 7.
Figure 12:
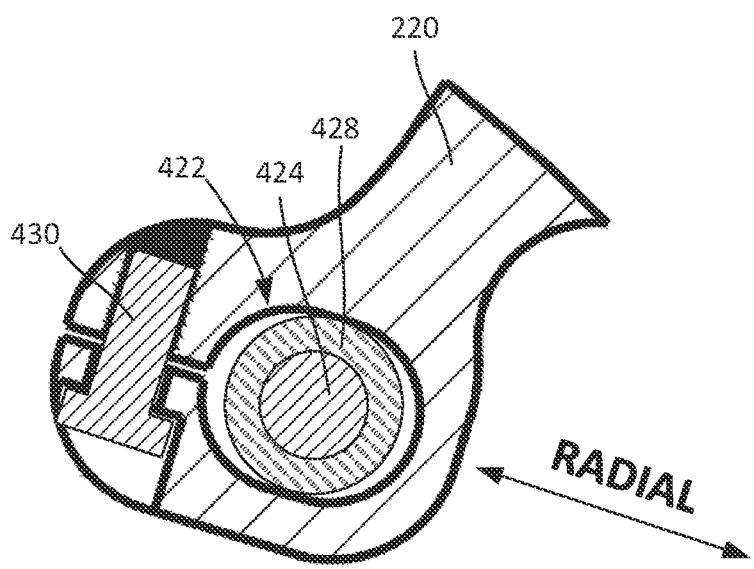
FIG. 12 is a cross-sectional view of the example bracket and an example post taken along line F-F of FIG. 6.

FIG. 11 is a cross-sectional view of the bracket 220 and the bracket bolt 424 taken along line E-E of FIG. 7. In the illustrated example, the bracket bolt 424 extends through the second opening 422 in the bracket 220 and is screwed into the threaded opening 426 in the left seatstay 208. The sleeve 428 is disposed around the bracket bolt 424. In the illustrated example, a portion of the sleeve 428 extends into the left seatstay 208. In other examples, the sleeve 428 may not extend into the left seatstay 208. FIG. 12 is a cross-sectional view of the bracket 220 and the bracket bolt 424 taken along line F-F of FIG. 6.

When installing the bracket 220, and before the clamp bolt 430 is tightened, the bracket 220 can move axially and radially along the sleeve 428. For example, as shown in FIG. 11, the portions of the bracket bolt 424 and the sleeve 428 extending from the left seatstay 208 are longer than the width of the bracket 220. This allows the bracket 220 to be positioned in differential axial locations along the bracket bolt 424 and the sleeve 428. Further, as shown in FIG. 12, the second opening 422 in the bracket 220 is elongated in the radial direction relative to the rotational axis 218 (FIG. 2) and/or the central axis 510 (FIG. 5C) of the first opening 412 (FIG. 4). This allows the bracket 220 to be positioned in differential radial locations along the bracket bolt 424 and the sleeve 428. As a result, the bracket 220 has a weaker axial and radial reference to the frame 102, which enables the bracket 220 to maintain a stronger axial and radial reference to the rear hub assembly 112.

An example method of installing the rear hub assembly 112, the rear brake 140, and the bracket 220 is disclosed as follows in connection with FIGS. 9, 11, and 12. Referring first to FIG. 9, the washer 420 can be placed around the sleeve 414. Then, the bracket 220 can be disposed inside of the left frame portion 202 and moved toward the left frame portion 202 to insert the sleeve 414 into the first axle opening 400. The rear brake caliper 152 (FIG. 1) can be coupled to the bracket 220 before or after installing the bracket 220. Then, the rear brake rotor 150 is coupled (e.g., via one or more fasteners, via a spline connection, etc.) to the rear hub 214, and then the rear hub 214 is positioned between the left and right frame portions 202, 204, such that the bracket 220 is disposed between the hub end cap 806 and the left frame portion 202. Then, the axle 216 is inserted (from the outboard side) through the sleeve 414 and the first axle opening 400, through the rear hub 214, and into the second axle opening 402 (FIG. 4) in the right frame portion 204 (FIG. 4). The axle 216 can then be tightened to axially secure the bracket 220 and the rear hub 214, thereby axially and radially securing the bracket 220 and the rear hub assembly 112. Then the nut 418 can be screwed onto the distal end 416 of the sleeve 414. After the bracket 220 is secured to the rear hub assembly 112, the bracket 220 can be coupled to the left seatstay 208 via the post 423. Referring to FIGS. 11 and 12, the bracket bolt 424 is inserted through the sleeve 428, and then the bracket bolt 424 and the sleeve 428 are inserted through the second opening 422 of the bracket 220 and screwed into the left seatstay 208. The inner diameter of the second opening 422 is larger than the outer diameter of the post 423, i.e., the sleeve 428. In some examples, before the clamp bolt 430 is tightened, a gap exists between the inner diameter of the second opening 422 and the sleeve 428. In other examples, the inner surface of the second opening 422 may be in contact with the sleeve 428. In either scenario, at this point, the bracket 220 can still move (e.g., slide) in the axial and radial directions relative to the bracket bolt 424, such as if the nut 418 is further tightened or loosened. The clamp bolt 430 can then be screwed into the bracket 220 and tightened. This reduces the inner diameter of the second opening 422 to clamp the bracket 220 onto the bracket bolt 424. In some examples, the clamp bolt 430 is tightened to a point where the bracket 220 is clamped onto bracket bolt 424 and substantially fixed in the axial and radial directions. In other examples, the clamp bolt 430 may be snuggly tightened, but still allow the bracket 220 to axially and radially slide relative to the bracket bolt 424. In other examples, the brake mount 200 can include one or more other mechanisms for reducing the inner diameter of the second opening 422 and/or increasing the outer diameter of the post 423 such that the bracket 220 is clamped onto the post 423. For example, the bracket 220 can include a ratchet or latch mechanism to close the gap 506 (FIG. 5F). In other example, the brake mount 200 can include one or more conical sleeves that can be inserted into the second opening 220 to reduce the size of the second opening 220 and secure the bracket 220 to the post 423. In still other examples, the bracket 220 may not be clamped at all. Instead, the bracket 220 can float on the bracket bolt 424 and the sleeve 428.

During braking, forces from the rear brake caliper 152 are transferred from the bracket 220 to the bracket bolt 424 and, thus, transferred to the frame 102. As shown in FIGS. 11 and 12, the sleeve 428 increases the size of contact area between the bracket 220 and the bracket bolt 424, which distributes the load on the bracket bolt 424. Many bicycles include a standardized threaded opening that receives a certain size bolt. Thus, the sleeve 428 enables the brake mount 200 to utilize the same opening and bolt while advantageously increasing the size of the contact area. However, in other examples, instead of using the sleeve, a larger diameter bolt or post may be used. In some examples, the sleeve 428 is constructed of a compliant material, such as plastic, rubber, or Teflon®.

Figure 13:
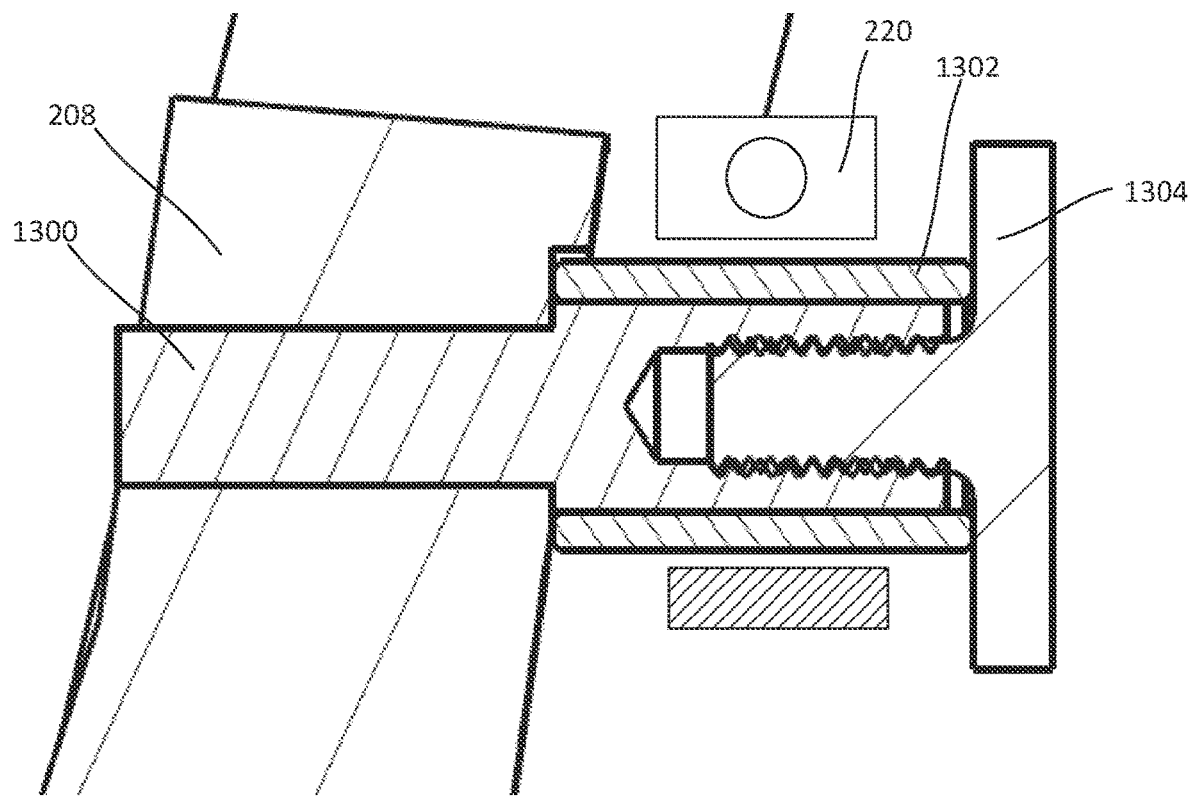
FIG. 13 shows an alternative example post that can be used in FIGS. 11 and 12.

FIG. 13 shows an alternative type of connection between the bracket 220 and the left seatstay 208. In FIG. 13, a post 1300 is coupled to and extends inboard of the left seatstay 208. In some examples, the post 1300 is integral with the left seatstay 208. In the illustrated example, a sleeve 1302 is disposed around the post 1300, which increase the contact area between the bracket 220 and the post 1300. In some examples, the sleeve 1302 is constructed of a compliant material, such as rubber or plastic. In some examples, a threaded fastener 1304 is screwed into the end of the post 1300 to keep the sleeve 1302 on the post 1300 and prevent the bracket 220 from moving inboard off of the post 1300. In some examples, when the threaded fastener 1304 is tightened, the sleeve 1302 is compressed axially, and therefore expands in the radial direction. The sleeve 1302 may expand into the bracket 220, which helps radially clamp the bracket 220 to the post 1300. In other examples, the sleeve 1302 and/or the threaded fastener 1304 may not be used. Instead, the bracket 220 can be in directed contact with the post 1300.

Figure 14:
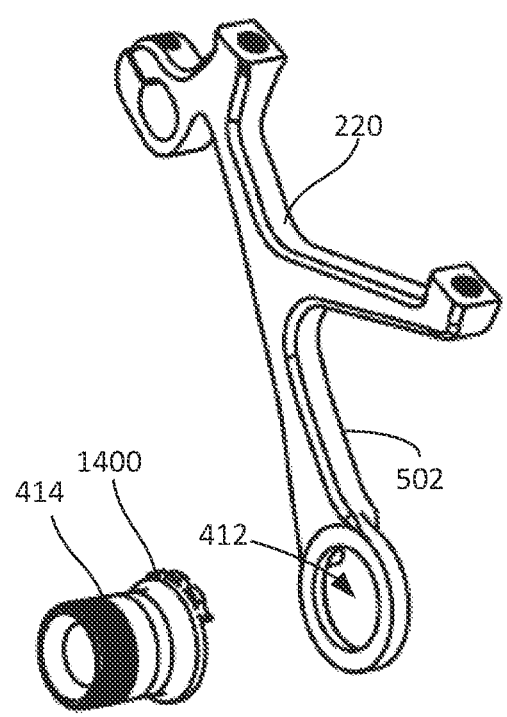
FIG. 14 is a perspective view of an example configuration in which the example bracket and the example sleeve are separate components.

While in the examples disclosed above the sleeve 414 is integral or coupled to the bracket 220, in other examples, the sleeve 414 can be separate from the bracket 220. FIG. 14 shows an example in which the sleeve 414 is separate from the bracket 220. In this example, the sleeve 414 has a first end 1400 that is enlarged. The sleeve 414 can be inserted through the first opening 412 in the bracket 220 from the second side 502 of the bracket 220 until the first end 1400 of the sleeve 414 engages the second side 502 of the bracket 220.

Figure 15:
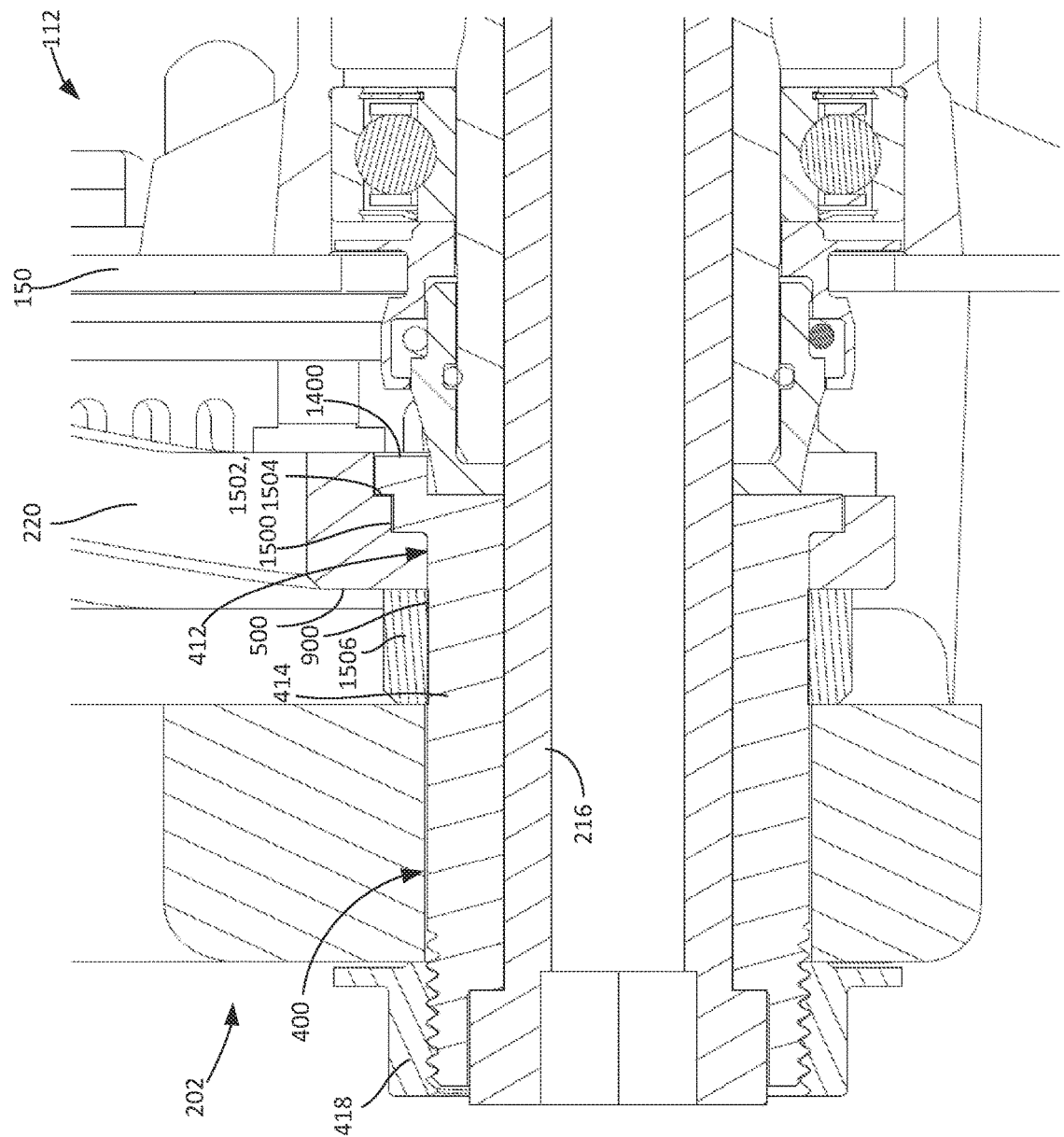
FIG. 15 is a cross-sectional view of the example configuration of FIG. 14 with the example rear hub assembly of FIG. 9.

FIG. 15 is a cross-sectional view of the bracket 220 and the sleeve 414 of FIG. 14 installed with the rear hub assembly 112, similar to the view in FIGS. 8 and 9. As shown in FIG. 15, the sleeve 414 is disposed in the first opening 412 of the bracket 220. An inner surface 1500 of the bracket 220 is engaged with the outer surface 900 of the sleeve 414. In the illustrated example, the outer surface 900 of the sleeve 414 near the first end 1400 has a first shoulder 1502. The inner surface 1500 of the first opening 412 in the bracket 220 has a second shoulder 1504 with a corresponding shape. The first shoulder 1502 of the sleeve 414 is engaged with the second shoulder 1504 of the bracket 220. This prevents the bracket 220 from moving inboard relative to the sleeve 414 and, thus, relative to the axle 216. The sleeve 414 fits tightly in the first opening 412 of the bracket 220, such as via an interference fit. This creates a strong radial reference between the bracket 220 and the rear hub assembly 112.

As shown in FIG. 15, the sleeve 414 extends outward from the first side 500 of the bracket 220. The sleeve 414 extends through the first axle opening 400 of the left frame portion 202. A washer 1506 is disposed around the sleeve 414, between the bracket 220 and the left frame portion 202. In this example, the washer 1506 is wider than the washer 420. The washer 1506 has an angled edge. When the axle 216 and the nut 418 are tightened, the bracket 220 is axially secured with the hub assembly 112. This creates a strong axial reference between the bracket 220 and the rear hub assembly 112 and, thus, between the rear brake caliper 152 (FIG. 1) and the rear brake rotor 150.

Example brake mounts, example hub assemblies, and related apparatus have been disclosed herein. Examples and example combination include the following:

Example 1 is a brake mount for coupling a brake caliper to a bicycle. The brake mount comprises a bracket having a first side and a second side opposite the first side. The bracket has bores to receive fasteners to couple the brake caliper to the bracket. The brake mount includes a sleeve extending from the first side of the bracket. An opening extends through the sleeve and the bracket. The opening is to receive an axle of a hub assembly of the bicycle. The sleeve is to extend into an axle opening in a frame of the bicycle. A distal end of the sleeve is threaded. The brake mount also includes a nut to be threadably coupled to the distal end of the sleeve when the sleeve is inserted into the axle opening in the frame.

Example 2 includes the brake mount of Example 1, wherein the sleeve is integral with the bracket.

Example 3 includes the brake mount of Examples 1 or 2, wherein an inner surface of the sleeve near the distal end has a shoulder to be engaged by a head of the axle.

Example 4 includes the brake mount of any of Examples 1-3, wherein the opening is a first opening, and wherein the bracket has a second opening to receive a post coupled to the frame.

Example 5 includes the brake mount of Example 4, wherein a plane bisects the first and second openings, and wherein axes of the set of bores intersect the plane between the first and second openings.

Example 6 includes the brake mount of Examples 4 or 5, wherein the second opening is elongated in a radial direction relative to a rotational axis of a hub of the hub assembly.

Example 7 includes the brake mount of any of Examples 4-6, wherein the bracket includes: a gap extending between the first and second sides, and between the second opening and an outer peripheral edge of the bracket; a fastener opening extending into the bracket; and a clamp bolt to be inserted into the fastener opening.

Example 8 is a brake mount for coupling a brake caliper to a bicycle. The brake mount comprises a post to be coupled to and extend from an inboard side of a frame of the bicycle. The brake mount also includes a bracket having bores to receive fasteners to couple the brake caliper to the bracket, a first opening to receive an axle of a hub assembly of the bicycle, and a second opening. The post is to extend through the second opening when the bracket is installed on the bicycle. The bracket also has a gap extending between the second opening and a peripheral edge of the bracket and a fastener opening extending into the bracket and across the gap. The brake mount includes a clamp bolt to be threadably inserted into the fastener opening to reduce an inner diameter of the second opening to clamp the bracket onto the post.

Example 9 includes the brake mount of Example 8, wherein the second opening is elongated in a radial direction relative to a central axis of the first opening.

Example 10 includes the brake mount of Examples 8 or 9, further including a sleeve to be disposed in the first opening such that an inner surface of the bracket is engaged with an outer surface of the sleeve.

Example 11 includes the brake mount of Example 10, wherein the outer surface of the sleeve has a first shoulder and the inner surface of the bracket has a second shoulder to be engaged by the first shoulder.

Example 12 includes the brake mount of Example 8, further including a sleeve to be disposed around the post to increase a contact area between the bracket and the post.

Example 13 is a hub assembly of a bicycle. The hub assembly comprises a hub, a brake rotor coupled to and rotatable with the hub, and a bracket having bores to receive fasteners to couple a brake caliper to the bracket. The bracket has a first side, a second side, and an opening extending between the first and second sides. The hub assembly includes a sleeve extending from the first side of the bracket, the sleeve coaxial with the opening in the bracket, and an axle extending through the sleeve, the opening in the bracket, the brake rotor, and the hub. The axle has a head engaged with the sleeve such that the sleeve and the bracket are axially clamped between the head of the axle and an end of the hub Example 14 includes the hub assembly of Example 13, wherein the sleeve has a distal end, wherein an inner surface of the sleeve has a shoulder near the distal end, and wherein the head of the axle is engaged with the shoulder.

Example 15 includes the hub assembly of Example 14, wherein the distal end of the sleeve is threaded, the hub assembly further including a nut to be threaded onto the distal end of the sleeve.

Example 16 includes the hub assembly of any of Examples 13-15, further including a washer around the sleeve, the washer to be disposed between the bracket and an inboard side of a frame of the bicycle when the hub assembly is coupled to the bicycle.

Example 17 includes the hub assembly of Example 16, wherein the washer is constructed of a compliant material.

Example 18 includes the hub assembly of Examples 16 or 17, wherein an outer peripheral edge of the washer is tapered.

Example 19 includes the hub assembly of Examples 16 or 17, wherein the washer has a spheric surface.

Example 20 includes the hub assembly of any of Examples 13-19, wherein the sleeve has a length such that when the hub assembly is coupled to the bicycle, the sleeve extends through an axle opening in a frame of the bicycle.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A brake mount for coupling a brake caliper to a bicycle, the brake mount comprising:
   a post to be coupled to and extend from an inboard side of a frame of the bicycle;
   a bracket having:
      bores to receive fasteners to couple the brake caliper to the bracket;
      a first opening to receive an axle of a hub assembly of the bicycle;
      a second opening, the post to extend through the second opening when the bracket is installed on the bicycle;
      a gap extending between the second opening and a peripheral edge of the bracket; and
      a fastener opening extending into the bracket and across the gap; and
   a clamp bolt to be threadably inserted into the fastener opening to reduce an inner diameter of the second opening to clamp the bracket onto the post.

2. The brake mount of claim 1, wherein the second opening is elongated in a radial direction from a central axis of the first opening.

3. The brake mount of claim 1, further including a sleeve to be disposed in the first opening such that an inner surface of the bracket is engaged with an outer surface of the sleeve.

4. The brake mount of claim 3, wherein the outer surface of the sleeve has a first shoulder and the inner surface of the bracket has a second shoulder to be engaged by the first shoulder.

5. The brake mount of claim 1, further including a sleeve to be disposed around the post to increase a contact area between the bracket and the post.

6. A hub assembly of a bicycle, the hub assembly comprising:
   a hub;
   a brake rotor coupled to and rotatable with the hub;
   a bracket having bores to receive fasteners to couple a brake caliper to the bracket, the bracket having a first side, a second side, and an opening extending between the first and second sides;
   a sleeve extending from the first side of the bracket, the sleeve coaxial with the opening in the bracket; and
   an axle extending through the sleeve, the opening in the bracket, the brake rotor, and the hub, the axle having a head engaged with the sleeve such that the sleeve and the bracket are axially clamped between the head of the axle and an end of the hub,
   wherein the sleeve has a length such that when the hub assembly is coupled to the bicycle, the sleeve extends through an axle opening in a frame of the bicycle.

7. The hub assembly of claim 6, wherein the sleeve has a distal end, wherein an inner surface of the sleeve has a shoulder near the distal end, and wherein the head of the axle is engaged with the shoulder.

8. The hub assembly of claim 7, wherein the distal end of the sleeve is threaded, the hub assembly further including a nut to be threaded onto the distal end of the sleeve.

9. The hub assembly of claim 6, further including a washer around the sleeve, the washer to be disposed between the bracket and an inboard side of a frame of the bicycle when the hub assembly is coupled to the bicycle.

10. The hub assembly of claim 9, wherein the washer is constructed of a compliant material.

11. The hub assembly of claim 9, wherein an outer peripheral edge of the washer is tapered.

12. The hub assembly of claim 9, wherein the washer has a spheric surface.

* * * * *